United States Patent
Yang et al.

(10) Patent No.: US 9,220,091 B2
(45) Date of Patent: Dec. 22, 2015

(54) METHOD AND TERMINAL FOR TRANSMITTING UPLINK CONTROL INFORMATION AND METHOD AND APPARATUS FOR DETERMINING THE NUMBER OF CODED SYMBOL

(75) Inventors: Weiwei Yang, Shenzhen (CN); Bo Dai, Shenzhen (CN); Chunli Liang, Shenzhen (CN); Shuqiang Xia, Shenzhen (CN); Bin Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 74 days.

(21) Appl. No.: 13/817,478

(22) PCT Filed: Jul. 22, 2011

(86) PCT No.: PCT/CN2011/077481
§ 371 (c)(1),
(2), (4) Date: Feb. 18, 2013

(87) PCT Pub. No.: WO2012/062130
PCT Pub. Date: May 18, 2012

(65) Prior Publication Data
US 2013/0155832 A1    Jun. 20, 2013

(30) Foreign Application Priority Data
Nov. 10, 2010 (CN) .......................... 2010 1 0539407

(51) Int. Cl.
*H04W 72/04* (2009.01)
*H04L 1/00* (2006.01)
*H04L 1/16* (2006.01)

(52) U.S. Cl.
CPC ......... *H04W 72/0413* (2013.01); *H04L 1/0026* (2013.01); *H04L 1/0072* (2013.01); *H04L 1/1671* (2013.01); *H04L 1/0071* (2013.01)

(58) Field of Classification Search
CPC ... H04L 1/0041; H04L 1/0057; H04L 1/0068; H04L 1/0026; H04L 1/0071; H04L 1/0072
USPC .......................... 370/254–350; 709/201–213
See application file for complete search history.

(56) References Cited

U.S. PATENT DOCUMENTS
2006/0077947 A1* 4/2006 Kim et al. ..................... 370/349
2010/0271970 A1  10/2010 Pan
(Continued)

FOREIGN PATENT DOCUMENTS
CN  101409894 A  4/2009
CN  101702631 A  5/2010
(Continued)

OTHER PUBLICATIONS
3 GPP TS 36.212 V9.2.0 (Jun. 2010).*
(Continued)

*Primary Examiner* — Ayaz Sheikh
*Assistant Examiner* — Debebe Asefa
(74) *Attorney, Agent, or Firm* — Oppedahl Patent Law Firm LLC

(57) ABSTRACT

The disclosure discloses a method and terminal for transmitting uplink control information. The method includes: coding the uplink control information required to be transmitted and data information corresponding to one or two transport blocks respectively, obtaining an encoded sequence according to a target length, and forming a corresponding coded modulation sequence from the encoded sequence according to a modulation mode (401); interleaving the obtained coded modulation sequence, and transmitting the interleaved coded modulation sequence on a layer corresponding to a Physical Uplink Shared Channel (PUSCH) (402). By adopting the method and terminal according to the disclosure the transmission of uplink control information with greater bits on the PUSCH is realized. The disclosure also provides a method for determining a number of code symbols required in each layer when transmitting uplink control information on the PUSCH, thus the purpose of determining a number of code symbols required in each layer when transmitting uplink control information on the PUSCH is realized.

19 Claims, 2 Drawing Sheets

(56) References Cited

U.S. PATENT DOCUMENTS

| | | | | |
|---|---|---|---|---|
| 2012/0009963 | A1* | 1/2012 | Kim et al. | 455/509 |
| 2012/0320951 | A1* | 12/2012 | Han et al. | 375/141 |

FOREIGN PATENT DOCUMENTS

| | | | |
|---|---|---|---|
| CN | 101807974 | A | 8/2010 |
| CN | 101984569 | A | 3/2011 |
| JP | 2013513323 | A | 4/2013 |
| JP | 2013532393 | A | 8/2013 |
| JP | 2013545348 | A | 12/2013 |
| KR | 100925444 | B1 | 11/2009 |
| KR | 1020100074328 | A | 7/2010 |
| RU | 2384983 | C2 | 3/2010 |
| WO | 2009107985 | A1 | 9/2009 |
| WO | 2009145525 | A2 | 12/2009 |
| WO | 2010107779 | A2 | 9/2010 |

OTHER PUBLICATIONS

3rd Generation Partnership Project; Technical Specification Group Radio Access Network; Evolved Universal Terrestrial Radio Access (E-UTRA); Multiplexing and channel coding (Release 9), 3GPP TS 36.212 V9.2.0, Jun. 2010 (31 pages).

ZTE, Remaining issues for UCI Multiplexing on PUSCH with MIMO Transmission, 3GPP TSG RAN WG1 Meeting #62bis, R1-105459, Oct. 2010. (7 pages).

Huawei, HiSilicon, Channel Interleaver Design for UL MIMO, 3GPP TSG RW WG1 meeting #62bis, R1-105141, Oct. 2010. (7 pages).

Samsung, UCI Resources for Single Codeword PUSCH, 3GPP TSG RAN WG1 #62bis, R1-105392, Oct. 2010. (3 pages).

Ericsson, ST-Ericsson, Coding and resource utilization for UCI on PUSCH, 3GPP TSG RAN WG1 Meeting #63, R1-105863, Nov. 9, 2010. (5 pages).

CMCC, CATT, CATR, Ericsson, ST-Ericsson, Huawei, HiSilicon, III, New Postcom, Potevio, ZTE, Way forward on Supporting ACK/NAK Payload Lager than 11 Bits in REL-10 TDD, TSG-RAN WG1 Meeting #62bis, R1-105776, Oct. 2010. (3 pages).

Samsung, et al., WF on the Resource Allocation Formula for RI and HARQ-ACK R1-105815 Oct. 16, 2010.

Nokia Siemens Networks, Nokia, On details of UCI multiplexing on PUSCH with SU-MIMO R1-106208 Nov. 9, 2010.

3GPP TSG RAN WG1 Meeting #61bis, Further Discussions on UCI Multiplexing on PUSCH in case of SU-MIMO, Alcatel-Lucent, Dresden Germany, Jun. 28, 2010, R1-104163.

International Search Report in international application No. PCT/CN2011/077481, mailed on Oct. 27, 2011.

English Translation of the Written Opinion of the International Search Authority in international application No. PCT/CN2011/077481, mailed on Oct. 27, 2011.

* cited by examiner

METHOD AND TERMINAL FOR TRANSMITTING UPLINK CONTROL INFORMATION AND METHOD AND APPARATUS FOR DETERMINING THE NUMBER OF CODED SYMBOL

TECHNICAL FIELD

The disclosure relates to the technical field of digital communications, particularly to a method and terminal for transmitting uplink control information, as well as a method and apparatus for determining the number of coded symbols required in each layer when transmitting uplink control information on a Physical Uplink Shared Channel (PUSCH).

BACKGROUND

At present, in a Long Term Evolution (LTE) system, the uplink control signaling required to be transmitted includes Acknowledgement/Negative Acknowledgement (ACK/NACK) information and three forms of Channel State Information (CSI) reflecting the state of a downlink physical channel: the Channels Quality Indication (CQI), the Pre-coding Matrix Indicator (PMI) and the Rank Indicator (RI).

In the LTE system, the ACK/NACK information is transmitted on a PUCCH in a PUCCH format 1/1a1/b. If a User Equipment (UE) needs to send uplink data, then the uplink data may be transmitted on the PUSCH. The feedback of CQI/PMI and RI may be a periodic feedback, or a non-periodic feedback. The feedback is shown in Table 1.

TABLE 1

| Dispatching mode | Periodic CQI reporting channel | Aperiodic CQI reporting channel |
|---|---|---|
| Frequency non-selectivity | PUCCH | |
| Frequency selectivity | PUCCH | PUSCH |

Wherein, as for the periodical CQI/PMI and RI, if the UE does not need to transmit the uplink data, then the periodical CQI/PMI and RI are transmitted in a PUCCH format 2/2a/2b on the PUCCH; If the UE needs to transmit the uplink data, then the CQI/PMI and RI are transmitted on the PUSCH; as for the aperiodical CQI/PMI and RI, the CQI/PMI and RI are transmitted only on the PUSCH.

FIG. 1 is a schematic diagram showing multiplexing of uplink control information and uplink data in a LTE system. FIG. 2 is a schematic diagram showing a PUSCH transmission process in a LTE system. In FIG. 1, a shadow part ▢ represents CQI/PMI information, a shadow part ▨ represents RI information, a shadow part ▩ represents ACK/NACK information, and a shadow part ☐ represents data. The uplink data are transmitted in form of a Transport Block (TB). After CRC attachment, code block segmentation, code block CRC attachment, channel coding, rate matching, code block concatenation and coding, the transport block performs multiplexing of uplink data and control signaling with CQI/PMI information. In the end, the coded ACK/NACK information, RI information and data are multiplexed through channel interleaving.

Wherein, the process of coding the uplink control information includes:

Firstly the required numbers of coded symbols $Q'_{ACK}$ and $Q'_{RI}$ calculated according to the formula

and the number of the coded symbols $Q'_{CQI}$ is calculated according to the formula

where O represents the number of bits of the uplink control information to be transmitted; $M_{sc}^{PUSCH}$ represents the bandwidth of the current subframe, which is used for PUSCH transmission and is expressed with the number of subcarriers; $N_{symb}^{PUSCH-initial}$ represents the number of the symbols used in initial PUSCH transmission except Demodulation Reference Signal (DMRS) and Sounding Reference Signal (SRS); $M_{SC}^{PUSCH-initial}$ represents the bandwidth when performing the initial PUSCH transmission and is expressed with the number of subcarriers; C represents the corresponding number of code blocks of the transport block after CRC and code block segmentation; $K_r$ represents the number of bits corresponding to each code block of the transport block. With regard to one transport block, C, $K_r$ and $M_{SC}^{PUSCH-initial}$ are obtained from initial PDCCH; when the PDCCH whose initial DCI format is 0 does not exist, $M_{SC}^{PUSCH-initial}$, C and $K_r$ may be obtained by the following two ways: (1) when the initial PUSCH adopts semi-static dispatching, they may be obtained from the PDCCH configured in the latest semi-static dispatching; (2) when PUSCH is triggered by random access acknowledgement authorization, they may be obtained from the random access); acknowledgement authorization corresponding to the same transport block; $\beta_{offset}^{PUSCH}$ represents or $\beta_{offset}^{HARQ-ACK}$ or $\beta_{offset}^{RI}$ or $\beta_{offset}^{CQI}$, and is configured by a high layer; L is the number of bits for CQI/PMI to perform CRC; and if $O_{CQI}$ is greater than 11, then L=8, otherwise L=0.

Then channel coding is performed. ACK/NACK and RI adopt a same coding method. If ACK/NACK or RI information is 1 bit, the encoded information is [$O_0$,y] when the modulation mode is the Quadrature Phase Shift Keying (QPSK), is [$O_0$,y,x,x] when the modulation mode is the 16 Quadrature Amplitude Modulation (16QAM), and is [$O_0$,y,x,x,x,x] when the modulation mode is 64QAM, where $O_0$ represents ACK/NACK or RI information, x and y represent the placeholders of the Euclidean is distance which maximize the modulation symbols when scrambling. If the ACK/NACK or RI information is of 2 bits, then the encoded information is [$O_0$,$O_1$,$O_2$,$O_0$,$O_1$,$O_2$] when the modulation method is QPSK, is [$O_0$,$O_1$,x,x,$O_2$,$O_0$,x,x,$O_1$,$O_2$,x,x] when the modulation method is 16QAM, and is [$O_0$,$O_1$,x,x,x,x,$O_2$,$O_0$,x,x,x,x,$O_1$,$O_2$,x,x,x,x] when the modulation method is 64QAM, where $O_0$,$O_1$ represent ACK/NACK or RI information of 2 bits, $O_2$=($O_0$⊕$O_1$), x represent the placeholder of the Euclidean distance which maximizes the modulation symbol when scrambling. In the LTE system, the ACK/NACK information may be greater than 2 and less than 11 bits, so when ACK/NACK information is greater than 2 and less than 11, the coding mode RM(32, O) is adopted; and when the bits of CQI/PMI are less than or equal to 11 bits, CQI/PMI adopts the coding mode RM(32, O). Otherwise, CRC attachment is performed at first, tail-biting convolutional codes with a length of 7 and a code rate of ⅓ as shown in FIG. 3 is performed, at last the bits of the encoded ACK/NACK information, RI information and CQI/PMI information are repeated until a target length $Q=Q'*Q_m$ is satisfied. The bits of the encoded information are recorded as $[q_0^{ACK}, q_1^{ACK}, q_2^{ACK}, \ldots, q_{Q_{ACK}-1}^{ACK}]$, $[q_0^{CQI}, q_1^{CQI}, q_2^{CQI}, \ldots, q_{Q_{CQI}-1}^{CQI}]$ and $[q_0^{RI}, q_1^{RI}, q_2^{RI}, \ldots, q_{Q_{RI}-1}^{RI}]$ respectively. Corresponding coded modulation sequences $[q_0^{ACK}, q_1^{ACK}, q_2^{ACK}, \ldots, q_{Q'_{ACK}-1}^{ACK}]$ and $[q_0^{RI}, q_1^{RI}, q_2^{RI}, \ldots, q_{Q'_{RI}-1}^{RI}]$ are generated according to the modulation order.

Wherein, the multiplexing of uplink data and control signaling is to cascade encoded CQI/PMI information and data in form of modulation symbols and record the result as $[g_0^i, g_1^i, g_2^i, \ldots, g_{H'_i-1}^i]$.

The process of channel interleaving is to write coded modulation sequences $[q_0^{ACK}, q_1^{ACK}, q_2^{ACK}, \ldots, q_{Q'_{ACK}-1}^{ACK}]$, $[q_0^{RI}, q_1^{RI}, q_2^{RI}, \ldots, q_{Q'_{RI}-1}^{RI}]$, and $[g_0^i, g_1^i, g_2^i, \ldots, g_{H'_i-1}^i]$ which is obtained after multiplexing data and control information into a virtual matrix in a specific order, and then the virtual matrix is read from the first line of the virtual matrix with the line number being increased, so as to ensure that ACK/NACK, RI, CQI/PMI and data can be mapped to the positions as shown in FIG. 1 in the subsequent process of mapping modulation symbols to physical resources. The process of channel interleaving is as follows: firstly, a virtual matrix is generated, the size of which is relevant to resource allocation of PUSCH; $[q_0^{RI}, q_1^{RI}, q_2^{RI}, \ldots, q_{Q'_{RI}-1}^{RI}]$ is written into the predetermined positions of the virtual matrix starting from the last line of the virtual matrix with the line number being decreased, then $[g_0^i, g_1^i, g_2^i, \ldots, g_{Q'_{RI}-1}^{RI}]$ is written into the virtual matrix line by line starting from the first line of the virtual matrix with the line number being increased; the positions of the logical units into which RI information has been written are skipped; at last, $[q_0^{ACK}, q_1^{ACK}, q_2^{ACK}, \ldots, q_{Q'_{ACK}-1}^{ACK}]$ is written into the predetermined positions of the virtual matrix from the last line of the virtual matrix with the line number being decreased. Wherein, the predetermined positions of RI information and ACK/NACK information are shown in Table 2 and Table 3. Table 2 describes the combinations of the columns into which RI information is written. Table 3 describes the combinations of the columns into which ACK/NACK information is written.

TABLE 2

| Type of CP | Combination of columns |
|---|---|
| Normal CP | {1, 4, 7, 10} |
| Extended CP | {0, 3, 5, 8} |

TABLE 3

| Type of CP | Combination of columns |
|---|---|
| Normal CP | {2, 3, 8, 9} |
| Extended CP | {1, 2, 6, 7} |

In an International Mobile Telecommunications-Advanced (IMT-Advanced) system, high-speed data transmission can be realized and the system capacity is large. Under the condition of low-speed movement and hot-spot coverage, the peak rate of the IMT-Advanced system may reach to 1 Gbit/s. Under the condition of high-speed movement and wide-area coverage, the peak rate of the IMT-Advanced system may reach to 100 Mbit/s.

In order to meet the requirements of International Telecommunication Union-Advanced (ITU-Advanced), a Long Term Evolution Advanced (LTE-A) system acting as the evolution standard of the LTE needs to support greater system bandwidth (100 MHz at most). On the basis of the existing LTE system, greater bandwidth may be obtained by combining the bandwidths of the LTE system. This technology is called Carrier Aggregation (CA), which can improve the frequency spectrum utilization of the IMT-Advance system and alleviate the shortage of frequency spectrum resources, is thereby optimizing the utilization of frequency spectrum resources. Further, in the LTE-A system, in order to support downlink transmission capacity and 8-layer transmission mode, higher uplink transmission rate is supported, so PUSCH transmission supports the form of spatial multiplexing. As for PUSCH which adopts transmission in the form of spatial multiplexing, the mapping relation from code stream to layer in the related art is the same as the mapping from code stream to the layer during the downlink transmission of the LTE. In other words, the PUSCH has two transport blocks which are transmitted in the corresponding transmission layers.

In the LTE-A system adopting the frequency spectrum aggregation technology, uplink bandwidth and downlink bandwidth may include a plurality of component carriers. In the case that the base station has the PDSCH dispatched to a certain UE on a plurality of downlink component carriers and the UE has the PUSCH to be sent in the current subframe, the UE needs to feed back on the PUSCH the ACK/NACK or RI information transmitted on the PDSCH of the downlink component carriers. According to the scenario of carrier aggregation, in a Time Division Duplexing (TDD) system, if the uplink and downlink subframe configuration in the related art is adopted, then the number of bits of the ACK/NACK information required to be fed back is at most 40. If the code corresponding to each carrier is bound, then the number of bits of ACK/NACK information required to be fed back is 20. However, the related art only provides a method for transmitting acknowledgment information which is greater than 2 bits and less than 11 bits on the PUSCH and does not provide a method for transmitting acknowledgment information which is more than 11 bits on the PUSCH. As for RI information, downlink supports 8-layer transmission, so that the RI information fed back is greater than 2 bits; and the CA technology is introduced, so that it is possible that the RI information fed back is greater than 11 bits. However, the related art only provides the method for transmitting the RI information which greater than 2 bits and less than 11 bits and does not provide the method for transmitting the RI information which is greater than 11 bits on the PUSCH.

Further, in the scenario of multiple uplink transport block/code stream, the related art specifies: CQI/PMI information is transmitted on a high code stream of the Modulation and Coding Scheme (MCS); ACK/NACK information and RI information is are repeatedly transmitted on all layers; the calculation formula $Q'=\max(Q', Q'_{min})$ is also provided to calculate the number of coded symbols required in each layer when transmitting the ACK/NACK and RI information on the PUSCH with spatial multiplexing, where $$Q'' = \min\left(\left\lceil\frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}}\right\rceil, 4 \cdot M_{sc}^{PUSCH}\right).$$

However, the related art does not provide the value of $Q'_{min}$, so that it is unable to obtain the number of coded symbols required in each layer when transmitting uplink control information on the PUSCH.

SUMMARY

In view of this, the main purpose of the disclosure is to provide a method and terminal for transmitting uplink control information, and a method and apparatus for determining a number of coded symbols required in each layer when transmitting uplink control information on the PUSCH, so as to solve the problem of transmitting uplink control information with greater bits on the PUSCH and the problem that the uplink control information is unable to determine the number of resources required in each layer when transmitting uplink control information.

In order to achieve the purpose, the technical solution of the disclosure is realized below.

The disclosure provides a method for transmitting uplink control information which includes:

the uplink control information required to be transmitted and data information corresponding to one or two transport blocks are coded respectively, an encoded sequence is obtained according to a target length, and a corresponding coded modulation sequence is formed from the encoded sequence according to a modulation mode;

the obtained coded modulation sequence is interleaved, and the interleaved coded modulation sequence is transmitted on the layer corresponding to a Physical Uplink Shared Channel (PUSCH).

The step of coding the uplink control information required to be transmitted, obtaining the encoded sequence according to the target length, and forming the corresponding coded modulation sequence from the encoded sequence according to is the modulation mode includes:

the uplink control information $o_0, o_1, \ldots o_{N-1}$ required to be transmitted is divided into two parts $o_0^0, o_1^0, \ldots o_{ceil(N/2)-1}^0$ and $o_0^1, o_1^1, \ldots o_{N-ceil(N/2)-1}^1$, where N denotes a number of bits of the uplink control information which is greater than 11;

a number of code symbols $Q'_0, Q'_1$ required to transmit the uplink control information is determined;

$o_0^0, o_1^1, \ldots o_{ceil(N/2)-1}^0$ and $o_0^1, o_1^1, \ldots o_{N-ceil(N/2)-1}^1$ are coded respectively, by using linear block code, and the coded modulation sequence corresponding to the uplink control information is obtained according to the encoded target lengths $Q_0 = Q'_0 * Q_m$ and $Q_1 = Q'_1 * Q_m$, a modulation order $Q_m$ corresponding to the transport block and a number of transport layers L corresponding to the transport block.

The step of determining the number of coded symbols $Q'_0$, $Q'_1$ required to transmit the uplink control information includes:

the number of code symbols $Q'_0, Q'_1$ required in each layer is calculated according to a number of bits ceil(N/2) corresponding to $o_0^0, o_1^0, \ldots o_{ceil(N/2)-1}^0$ and a number of bits N-ceil(N/2) corresponding to $o_0^1, o_1^1, \ldots o_{ceil(N/2)-1}^1$.

The step of determining the number of coded symbols $Q'_0$, $Q'_1$ required to transmit the uplink control information includes:

the number of coded symbols Q' required is calculated according to N when the number of bits N corresponding to $o_0, o_1, \ldots o_{N-1}$ is even, the number of coded symbols Q' required is calculated according to N+1 when the number of bits N corresponding to $o_0, o_1, \ldots o_{N-1}$ is odd, then the number of coded symbols $Q'_0$ required in each layer for transmitting $o_0^0, o_1^0, \ldots o_{ceil(N/2)-1}^0$ equals to Q'/2, and the number of coded symbols $Q'_1$ required in each layer for transmitting $o_0^1, o_1^1, \ldots o_{N-ceil(N/2)-1}^1$ equals to Q'/2.

The step of obtaining the coded modulation sequence corresponding to the uplink control information according to the encoded target lengths $Q_0 = Q'_0 * Q_m$ and $Q_1 = Q'_1 * Q_m$, the modulation order $Q_m$ corresponding to the transport block and the number of transport layers L corresponding to the transport block includes:

the encoded sequences $q_0^1, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively, according to the encoded target lengths $Q_0$ and $Q_1$; $q_0, q_1, \ldots q_Q$ is obtained by cascading of $q_0^0, q_1^0, \ldots q_{Q_0}^0$ and $q_0^1, q_1^1, \ldots q_{Q_1}^1$ when the number of transport layers L corresponding to the transport block is 1, and then the coded modulation sequence $\underline{q}_0, \underline{q}_1, \ldots \underline{q}_{Q'}$ is formed according to the modulation order $Q_m$; and $q_0, q_1, \ldots q_Q$ is obtained by cascading of $q_0^0, q_1^0, \ldots q_{Q_0}^0$ and $q_0^1, q_1^1, \ldots q_{Q_1}^1$ when the number of transport layers L corresponding to the transport block is 2, and $q_0, q_1, \ldots q_Q$ is repeated, and the coded modulation sequence $\underline{q}_0, \underline{q}_1, \ldots \underline{q}_{Q'}$ is formed according to the modulation order $Q_m$.

The step of obtaining the coded modulation sequence corresponding to the uplink control information according to the encoded target lengths $Q_0 = Q'_0 * Q_m$ and $Q_1 = Q'_1 * Q_m$, the modulation order $Q_m$ corresponding to the transport block and the number of transport layers L corresponding to the transport block includes:

the encoded sequences $q_0^0, q_1^0, \ldots q_{Q_0}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively, according to the encoded target lengths $Q_0, Q_1$, the corresponding coded modulation sequences $\underline{q}_0^0, \underline{q}_1^0, \ldots \underline{q}_{Q'_0}^0$ and $\underline{q}_0^1, \underline{q}_1^1, \ldots \underline{q}_{Q'_1}^1$ are formed according to the modulation order $Q_m$, $\underline{q}_0, \underline{q}_1, \ldots \underline{q}_{Q'}$ is obtained by cascading of $\underline{q}_0^0, \underline{q}_1^0, \ldots \underline{q}_{Q'_0}^0$ and $\underline{q}_0^1, \underline{q}_1^1, \ldots \underline{q}_{Q'_1}^1$ when the number of transport layers L corresponding to the transport block is 1, and $\underline{q}_0, \underline{q}_1, \ldots \underline{q}_{Q'}$ is obtained by respectively repeating and then cascading of $\underline{q}_0^0, \underline{q}_1^0, \ldots \underline{q}_{Q'_0}^0$ and $\underline{q}_0^1, \underline{q}_1^1, \ldots \underline{q}_{Q'_1}^1$ when the number of transport layers L corresponding to the transport block is 2.

The step of obtaining the coded modulation sequence corresponding to the uplink control information according to the encoded target lengths $Q_0 = *Q_m$ and $Q_1 = Q_1 * Q_m$, the modulation order $Q_m$ corresponding to the transport block and the number of transport layers L corresponding to the transport block includes:

the encoded sequences $q_0^0, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively, according to the encoded target length $Q_0, Q_1$, the coded modulation sequence $\underline{q}_0, \underline{q}_1, \ldots \underline{q}_{Q'}$ is formed from $q_0^0, q_1^0, \ldots q_{Q_0}^0$ and $q_0^1, q_1^1, \ldots q_{Q_1}^1$ when the number of transport layers L corresponding to the transport block is 1, and the coded modulation sequence $\underline{q}_0, \underline{q}_1, \ldots \underline{q}_{Q'}$ is formed by respectively repeating and then cascading of $q_0^0, q_1^0, \ldots q_{Q_0}^0$ and $q_0^1, q_1^1, \ldots q_{Q_1}^1$ when the number of transport layers L corresponding to the transport block is 2.

The uplink control information is one or more of: ACK/NACK information and Rank Indication (RI) information.

The step of coding the uplink control information required to be transmitted, obtaining the coded sequence according to the target length, and forming the corresponding coded modulation sequence from the coded sequence according to the modulation mode includes:

a number of code symbols Q' required to transmit the uplink control information $o_0, o_1, \ldots o_{N-1}$ is calculated, $o_0, o_1, \ldots o_{N-1}$ is coded by using a tail-biting convolutional code with a length of 7 and a code rate of ⅓, or by conducting Cyclic Redundancy Check (CRC) with a length of 8 before the coding, wherein N denotes a number of bits of the uplink control information which is greater than 11;

as for ACK/NACK response information and RI information, the corresponding encoded sequence $q_0, q_1, \ldots q_Q$ is obtained according to the encoded target length $Q=Q'*Q_m$ and the corresponding coded modulation sequence $\underline{q}_0, \underline{q}_1, \ldots \underline{q}_{Q'}$ is obtained according to a corresponding modulation order $Q_m$ when a number of transport layers L corresponding to a transport block is 1; and the corresponding encoded sequence $q_0, q_1, \ldots q_Q$ is obtained according to the encoded target length $Q=Q'*Q_m$ when the number of transport layers L corresponding to the transport block is 2, $q_0, q_1, \ldots q_Q$ is repeated and the corresponding coded modulation sequence $\underline{q}_0, \underline{q}_1, \ldots \underline{q}_{Q'}$ is obtained according to the corresponding modulation order $Q_m$;

as for Channel Quality Indicator (CQI)/Pre-coding Matrix Indication (PMI) information, the corresponding encoded sequence $q_0, q_1, \ldots q_Q$ is obtained according to is the encoded target length $Q=Q'*Q_m$ when the number of transport layers L corresponding to the transport block is 1, and the corresponding coded modulation sequence $\underline{q}_0, \underline{q}_1, \ldots \underline{q}_{Q'}$ is obtained according to the corresponding modulation order $Q_m$ when the transport block does not have data information to be transmitted; the corresponding encoded sequence $q_0, q_1, \ldots q_Q$ is obtained according to the encoded target length $Q=L*Q'*Q_m$ when the number of transport layers L corresponding to the transport block is 2, and the corresponding coded modulation sequence $\underline{q}_0, \underline{q}_1, \ldots \underline{q}_{Q'}$ is obtained according to the corresponding modulation order $Q_m$ when the transport block does not have data information to be transmitted.

The step of coding the data information corresponding to the one or two transport blocks respectively, obtaining the encoded sequence according to the target length, and forming the corresponding coded modulation sequence from the encoded sequence according to the modulation mode includes:

CRC with a block length of 24, code block segmentation and CRC with a subblock length of 24 are performed on the data information corresponding to the transport block required to be transmitted, channel coding and rate matching are performed by using Turbo codes with a code rate of ⅓, the target length G of the transport block is calculated according to a corresponding bandwidth, number of symbols, the target length of CQI/PMI information on the transport block and the target length of RI information required to be transmitted on the transport block at the same time, thereby a corresponding encoded data information $f_0, f_1, f_2, f_3, \ldots, f_{G-1}$ is obtained;

the encoded data information $f_0, f_1, f_2, f_3, \ldots, f_{G-1}$ and encoded CQI/PMI information $q_0, q_1, q_2, q_3, \ldots, q_{Q_{CQI}-1}$ are cascaded when the transport block also requires to transmit CQI/PMI information, and a corresponding data/control coded modulation sequence $g_0, g_1, g_2, g_3, \ldots, g_{H-1}$ is formed according to a modulation order of the transport block and a number of transport layers corresponding to the transport block, where $H=(G+Q_{CQI})$, and a length of the corresponding data/control coded modulation sequence $H'=H/Q_m$;

the corresponding data coded modulation sequence $\underline{g}_0, \underline{g}_1, \underline{g}_2, \underline{g}_3, \ldots, \underline{g}_{H'-1}$ is formed from the encoded data information according to the modulation order and the number of transport layers corresponding to the transport block when the transport block does not need to transmit CQI/PMI information, where H=G and the length of the corresponding control coded modulation sequence $H'=H/Q_m$.

The disclosure also provides a method for determining a number of code symbols required in each layer when transmitting uplink control information on PUSCH which includes:

the number of code symbols required in each layer is determined with the following formula: $Q'=\max(Q', Q'_{min})$, where $Q'_{min}=\lceil \beta_{offset}^{PUSCH} * \alpha \rceil$, or $Q'_{min}=\lceil \alpha \rceil$, or $Q'_{min}=\alpha$, $\lceil\ \rceil$ represents ceil, $\beta_{offset}^{PUSCH}$ is an offset corresponding to the uplink control information and the value is configured by high-layer signaling.

The value of α is one of the following values:
the value of α is configured by a high layer; or $$\alpha = \begin{cases} p, & \beta_{offset}^{PUSCH} >= m \\ q, & \beta_{offset}^{PUSCH} < m, \end{cases}$$

where the values of p, q and m are positive numbers agreed by a base station and a UE; or
the value of α is obtained based on the value of $\beta_{offset}^{PUSCH}$; or
α=0; or
$\alpha=c*O/Q_m$, where the value of c is a positive number configured by the high layer or agreed by the base station and the UE, and the value of $Q_m$ is a positive number not being 0 agreed by the base station and the UE or a modulation order corresponding to a transport block.

When there is only one transport block, then the value of $Q_m$ is the modulation order corresponding to the transport block; and when there are two transport blocks, then the value of $Q_m$ is a smaller one or an average of the modulation orders corresponding to the two transport blocks.

The value of Q' is one of the following:

$$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right), \text{ or}$$

$$Q'' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right), \text{ or}$$

$$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right), \text{ or}$$

$$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r + O_{CQI-MIN}} \right\rceil, 4 \cdot M_{sc}^{PUSCH}\right);$$

where $O_{CQI-MIN}$ denotes a number of bits of CQI/PMI information after CRC when the rank of a single downlink cell is 1; O denotes a number of bits of the uplink control information to be transmitted; $N_{symb}^{PUSCH-initial}$ denotes the number of symbols used in initial PUSCH transmission other than Demodulation Reference Signal (DMRS) and Sounding Reference Signal (SRS); $M_{sc}^{PUSCH-initial}$ denotes a bandwidth during initial PUSCH transmission and is expressed in a number of subcarriers; $M_{sc}^{PUSCH}$ denotes a bandwidth of current subframe for PUSCH transmission and is expressed in a number of subcarriers; $C^{(i)}$ denotes a number of code blocks corresponding to the transport block i after CRC and code block segmentation; $K_r^{(i)}$ denotes a number of bits corresponding to each code block of the transport block i, and the value of i is 1 or 2; $\beta_{offset}^{PUSCH}$ denotes $\beta_{offset}^{HARQ-ACK}$ or $\beta_{offset}^{RI}$, and is configured by a high layer.

The uplink control information is one or more of: ACK/NACK information and RI information.

The disclosure also provides a terminal for transmitting uplink control information which includes:

a code modulation module configured to code the uplink control information required to be transmitted and data information corresponding to one or two transport blocks respectively, obtain an encoded sequence according to a target length, and form a corresponding coded modulation sequence from the encoded sequence according to a modulation mode; and an interleaving and transmitting module configured to interleave the obtained coded modulation sequence, and transmit the interleaved coded modulation sequence on a layer corresponding to PUSCH.

The code modulation module is further configured to divide the uplink control information $o_0, o_1, \ldots o_{N-1}$ required to be transmitted into two parts $o_0^0, o_1^0, \ldots o_{ceil(N/2)-1}^0$ and $o_0^1, o_1^1, \ldots o_{N-ceil(N/2)-1}^1$, where N denotes a number of bits of the uplink control information which is greater than 11; determine a number of code symbols $Q'_0$, $Q'_1$ required to transmit the uplink control information; code $o_0^0, o_1^0, \ldots o_{ceil(N/2)-1}^0$ and $o_0^1, o_1^1, \ldots o_{N-ceil(N/2)-1}^1$, respectively, by using linear block code, and obtain the coded modulation sequence corresponding to the uplink control information according to encoded target lengths $Q_0 = Q'_0 * Q_m$, $Q_1 = Q'_1 * Q_m$, a modulation order $Q_m$ corresponding to the transport block and a number of transport layers L corresponding to the transport block.

The code modulation module is further configured to calculate the number of code symbols $Q'$ required to transmit the uplink control information $o_0, o_1, \ldots o_{N-1}$, and code $o_0, o_1, \ldots o_{N-1}$ using a tail-biting convolutional code with a length of 7 and a code rate of ⅓, or conducting Cyclic Redundancy Check (CRC) with a length of 8 before the coding, wherein N denotes the number of bits of the uplink control information which is greater than 11;

as for ACK/NACK information and Rank Indication (RI) information, when a number of transport layers L corresponding to the transport block is 1, then the corresponding encoded sequence $q_0, q_1, \ldots q_Q$ is obtained according to the encoded target length $Q = Q' * Q_m$ and the corresponding coded modulation sequence $\underline{q}_0, \underline{q}_1, \ldots \underline{q}_{Q'}$ is obtained according to the modulation order $Q_m$; when the number of transport layers L corresponding to the transport block is 2, then the corresponding encoded sequence $q_0, q_1, \ldots q_Q$ is obtained according to the encoded target length $Q = Q' * Q_m, q_0, q_1, \ldots q_Q$ is repeated, and the corresponding coded modulation sequence $\underline{q}_0, \underline{q}_1, \ldots \underline{q}_{Q'}$ is obtained according to the corresponding modulation order $Q_m$;

as for Channel Quality Indicator (CQI)/Pre-coding Matrix Indication (PMI) information, when the number of transport layers L corresponding to the transport block is 1, then the corresponding encoded sequence $q_0, q_1, \ldots q_Q$ is obtained according to the encoded target length $Q = Q' * Q_m$; when the transport block does not have data information to be transmitted, then the corresponding coded modulation sequence $\underline{q}_0, \underline{q}_1, \ldots \underline{q}_{Q'}$ is obtained according to the corresponding modulation order $Q_m$; when the number of transport layers L corresponding to the transport block is 2, then the corresponding encoded sequence $q_0, q_1, \ldots q_Q$ is obtained according to the encoded target length $Q = L * Q' * Q_m$; when the transport block does not have data information to be transmitted, then the corresponding coded modulation sequence $\underline{q}_0, \underline{q}_1, \ldots \underline{q}_{Q'}$ is obtained according to the corresponding modulation order $Q_m$.

The code modulation module is further configured to perform CRC with a block length of 24, code block segmentation and CRC with a subblock length of 24 on the data information corresponding to the transport block required to be transmitted, perform channel coding and rate matching using Turbo codes with a code rate of ⅓, calculate the target length G of the transport block according to a corresponding bandwidth, number of symbols, the target length of CQI/PMI information on the transport block and the target length of RI information required to be transmitted on the transport block at the same time, thereby obtain a corresponding encoded data information $f_0, f_1, f_2, f_3, \ldots, f_{G-1}$;

when the transport block also requires to transmit CQI/PMI information, then the encoded data information $f_0, f_1, f_2, f_3, \ldots, f_{G-1}$ and encoded CQI/PMI information $q_0, q_1, q_2, q_3, \ldots, q_{Q_{CQI}-1}$ are cascaded, and a corresponding data/control coded modulation sequence $\underline{g}_0, \underline{g}_1, \underline{g}_2, \underline{g}_3, \ldots, \underline{g}_{H'-1}$ is formed according to a modulation order of the transport block and a number of transport layers corresponding to the transport block, where $H = (G + Q_{CQI})$, and a length of the corresponding data/control coded is modulation sequence $H' = H/Q_m$;

when the transport block does not need to transmit CQI/PMI information, then the corresponding data coded modulation sequence $\underline{g}_0, \underline{g}_1, \underline{g}_2, \underline{g}_3, \ldots \underline{g}_{H'-1}$ is formed from the encoded data information $f_0, f_1, f_2, f_3, \ldots, f_{G-1}$ according to the modulation order and the number of transport layers corresponding to the transport block, where $H = G$ and the length of the corresponding control coded modulation sequence $H' = H/Q_m$.

The disclosure also provides an apparatus for determining a number of code symbols required in each layer when transmitting uplink control information on PUSCH which includes:

a module for determining the number of code symbols, configured to determine the number of code symbols required in each layer with the following formula: $Q' = \max(Q'', Q'_{min})$;

a parameter determination module, configured to determine $Q'_{min} = \lceil \beta_{offset}^{PUSCH} * \alpha \rceil$, or $Q'_{min} = \lceil \alpha \rceil$, or $Q'_{min} = \alpha$, where $\lceil \ \rceil$ represents ceil, and $\beta_{offset}^{PUSCH}$ is an offset corresponding to the uplink control information and the value is configured by high-layer signaling.

The disclosure provides a method and terminal for transmitting uplink control information, wherein the uplink control information required to be transmitted and data information corresponding to one or two transport blocks is coded respectively, an encoded sequence is obtained according to a target length, and a corresponding coded modulation sequence is formed from the encoded sequence according to a modulation mode; the obtained coded modulation sequence interleaved, and the interleaved coded modulation sequence is transmitted on a layer corresponding to a PUSCH.

The disclosure provides a method and apparatus for determining a number of code symbols required in each layer when transmitting uplink control information on PUSCH, wherein the number of code symbols required in each layer is determined with the following formula: $Q' = \max(Q', Q'_{min})$, where $Q'_{min} = \lceil \beta_{offset}^{PUSCH} * \alpha \rceil$, or $Q'_{min} = \lceil \alpha \rceil$, or $Q'_{min} = \alpha$, $\lceil \ \rceil$ represents ceil, $\beta_{offset}^{PUSCH}$ is an offset corresponding to the uplink control information and the value is configured by high-layer signaling.

By adopting the disclosure, the transmission of uplink control information with greater bits on the PUSCH is realized and the number of the resources required in each layer when transmitting the uplink control information on the PUSCH is determined.

DETAILED DESCRIPTION

The technical solution of the disclosure is further described in detail with reference to accompanying drawings and embodiments.

Figure 4:
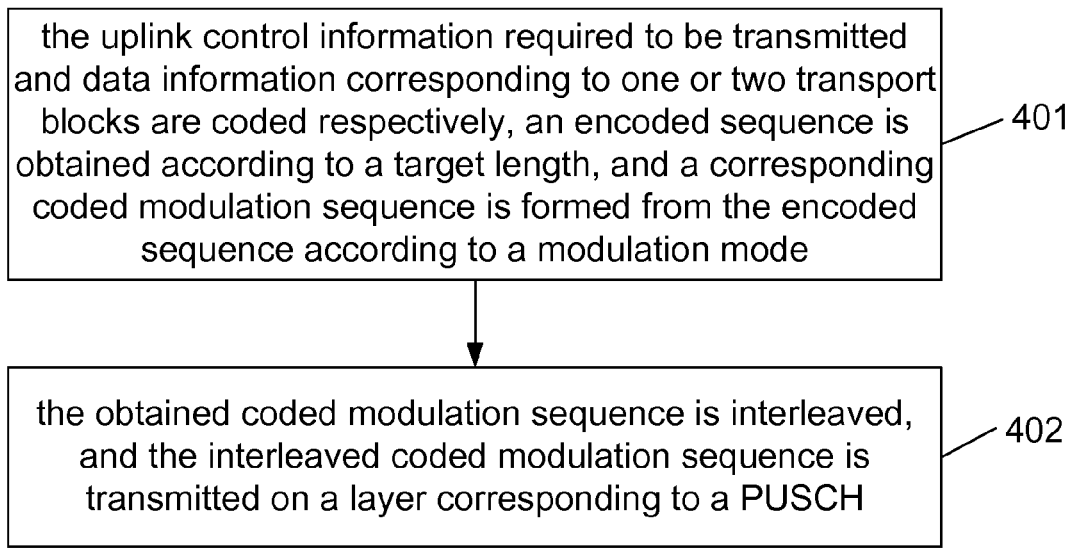
FIG. 4 is a flowchart showing a method for transmitting uplink control information on PUSCH according to the disclosure.

In order to solve the problem that the method for transmitting uplink control information on the PUSCH does not support the transmission of uplink control information of greater than 11 bits in the related art, the disclosure provides a method for transmitting uplink control information on the PUSCH. As shown in FIG. 4, the method mainly includes the steps below.

Step 401, the uplink control information required to be transmitted and data information corresponding to one or two transport blocks are coded respectively, an encoded sequence is obtained according to a target length, and a corresponding coded modulation sequence is formed from the encoded sequence according to a modulation mode.

Wherein, the uplink control information is processed by one or more of the following two Modes:

Mode 1, the uplink control information $o_0, o_1, \ldots o_{N-1}$ (wherein N is greater than 11) required to be transmitted is divided into two parts $o_0^0, o_1^0, \ldots o_{ceil(N/2)-1}^0$ and $o_0^1, o_1^1, \ldots o_{N-ceil(N/2)-1}^1$; a number of code symbols $Q'_0, Q'_1$ required to transmit the uplink control information is calculated; $o_0^0, o_1^0, \ldots o_{ceil(N/2)-1}^0$ and $o_0^1, o_1^1, \ldots o_{N-ceil(N/2)-1}^1$ are coded respectively, by using linear block code, and the coded modulation sequence corresponding to the uplink control information is obtained according to the encoded target lengths $Q_0=Q'_0*Q_m$ and $Q_1=Q'_1*Q_m$, a modulation order $Q_m$ corresponding to the transport block and a number of transport layers L corresponding to the transport block.

Further, the process of calculating a number of code symbols $Q'_0, Q'_1$ required to transmit the uplink control information can be implemented by adopting any one of the following ways:

1, the number of code symbols $Q'_0, Q'_1$ a required in each layer is calculated according to a number of bits ceil(N/2) corresponding to $o_0^0, o_1^0, \ldots o_{ceil(N/2)-1}^0$ and a number of bits N-ceil(N/2) corresponding to $o_0^1, o_1^1, \ldots o_{N-ceil(N/2)-1}^1$; and 2, the number of code symbols Q' required is calculated according to N when the number of bits N corresponding to $o_0, o_1, \ldots o_{N-1}$ is even, the number of code symbols Q' required is calculated according to N+1 when the number of bits N corresponding to $o_0, o_1, \ldots o_{N-1}$ is odd, then the number of code symbols $Q'_0$ required in each layer for transmitting $o_0^0$, $o_1^0, \ldots o_{ceil(N/2)-1}^0$ equals to Q'/2, and the number of code symbols a required in each layer for transmitting $o_0^1, o_1^1, \ldots o_{N-ceil(N/2)-1}^1$ equals to Q'/2.

Further, the step of obtaining the coded modulation sequence corresponding to the uplink control information according to the encoded target lengths $Q_0=Q'_0*Q_m$ and $Q_1=Q'_1*Q_m$, the modulation order $Q_m$ corresponding to the transport block and the number of transport layers L corresponding to the transport block can be implemented by any one of the following ways:

1, the encoded sequences $q_0^0, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively, according to the encoded target lengths $Q_0$ and $Q_1$; $q_0, q_1, \ldots q_Q$ is obtained by cascading of $q_0^0, q_1^0, \ldots q_{Q_0}^0$ and $q_0^1, q_1^1, \ldots q_{Q_1}^1$ when the number of transport layers L corresponding to the transport block is 1, and then the coded modulation sequence $q_0, q_1, \ldots q_{Q'}$ is formed according to the modulation order $Q_m$; and $q_0, q_1, \ldots q_Q$ is obtained by cascading of $q_0^0, q_1^0, \ldots q_{Q_0}^0$ and $q_0^1, q_1^1, \ldots q_{Q_1}^1$ when the number of transport layers L corresponding to the transport block is 2, and $q_0, q_1, \ldots q_Q$ is repeated, and the coded modulation sequence $q_0, q_1, \ldots q_{Q'}$ is formed according to the modulation order.

2, the encoded sequences $q_0^0, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively according to the encoded target lengths $Q_0$, $Q_1$, the corresponding coded modulation sequences $q_0^0, q_1^0, \ldots q_{Q'_0}^0$ and $q_0^1, q_1^1, \ldots q_{Q'_1}^1$ are formed according to the modulation order $Q_m$, $q_0, q_1, \ldots q_{Q'}$ is obtained by cascading of $q_0^0, q_1^0, \ldots q_{Q'_0}^0$ and $q_0^1, q_1^1, \ldots q_{Q'_1}^1$ when the number of transport layers L corresponding to the transport block is 1; and $q_0, q_1, \ldots q_{Q'}$ is obtained by respectively repeating and then cascading of $q_0^0, q_1^0, \ldots q_{Q'_0}^0$ and $q_0^1, q_1^1, \ldots q_{Q'_1}^1$ when the number of transport layers L corresponding to the transport block is 2.

3, the encoded sequences $q_0^0, q_1^0, \ldots q_{Q'_0}^0$ and $q_0^1, q_1^1, \ldots q_{Q'_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively, according to the encoded target length $Q_0$, $Q_1$, the coded modulation sequence $q_0, q_1, \ldots q_{Q'}$ is formed from $q_0^0, q_1^0, \ldots q_{Q_0}^0$ and $q_0^1, q_1^1, \ldots q_{Q_1}^1$ when the number of transport layers L corresponding to the transport block is 1, and the coded modulation sequence $q_0, q_1, \ldots q_{Q'}$ is formed by respectively repeating and then cascading of $q_0^0, q_1^0, \ldots q_{Q_0}^0$ and $q_0^1, q_1^1, \ldots q_{Q_1}^1$ when the number of transport layers L corresponding to the transport block is 2.

It should be noted that the uplink control information is one or more of: ACK/NACK information and RI information.

Figure 1:
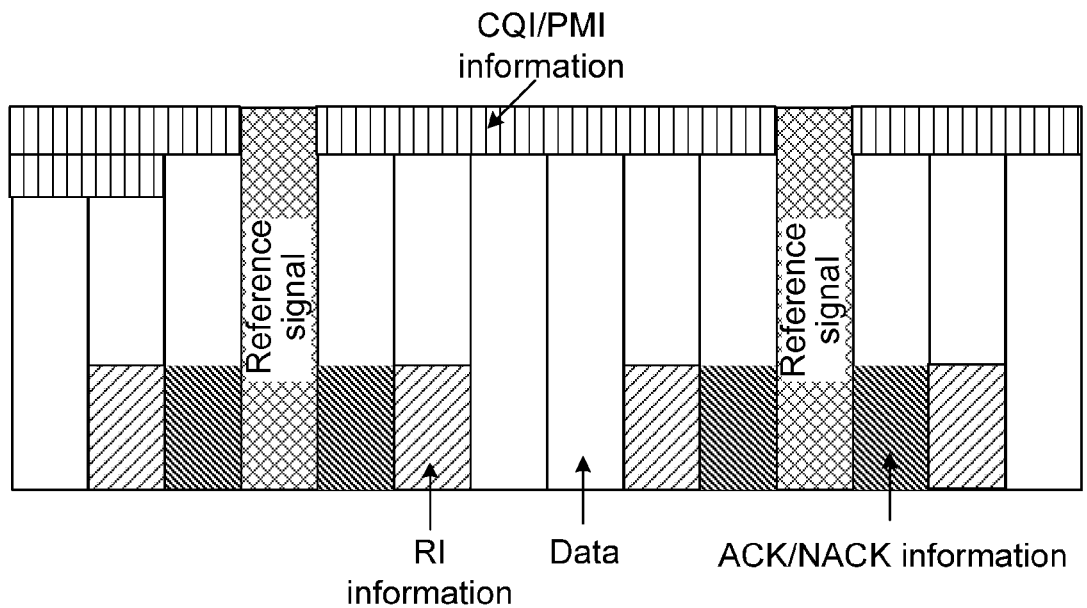
FIG. 1 is a schematic diagram showing multiplexing of uplink control information and uplink data in an existing LTE system.
Figure 2:
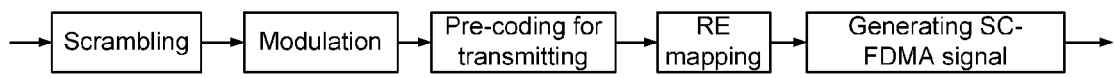
FIG. 2 is a schematic diagram showing a PUSCH transmission process in an existing LTE system.
Figure 3:
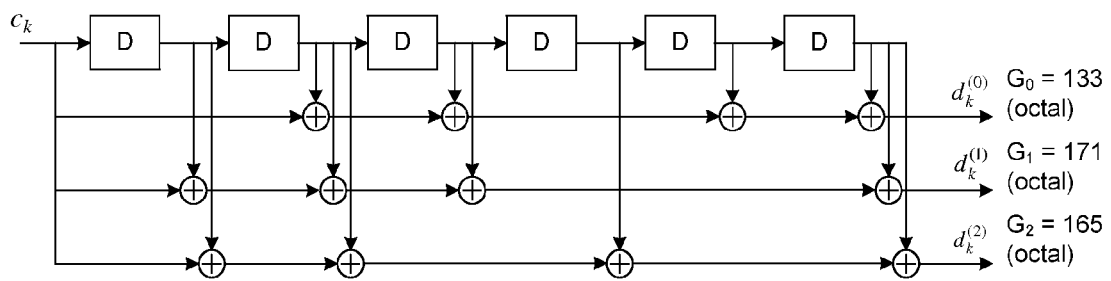
FIG. 3 is a schematic diagram showing a tail-biting convolutional code with a length of 7 and a code rate of ⅓ in the related art.

Mode 2, a number of code symbols Q' required to transmit the uplink control information $o_0, o_1, \ldots o_{N-1}$ (wherein N is greater than 11) is calculated, $o_0, o_1, \ldots o_{N-1}$ is coded by using a tail-biting convolutional code with a length of 7 and a code rate of ⅓ (as shown in FIG. 3), or by conducting Cyclic Redundancy Check (CRC) with a length of 8 before the coding; as for ACK/NACK response information and RI information, the corresponding encoded sequence $q_0, q_1, \ldots q_Q$ is obtained according to the encoded is target length $Q=Q'*Q_m$ and the corresponding coded modulation sequence $q_0, q_1, \ldots q_{Q'}$ is obtained according to a corresponding modulation order $Q_m$ when a number of transport layers L corresponding to a transport block is 1; and the corresponding encoded sequence $q_0, q_1, \ldots q_Q$ is obtained according to the encoded target length $Q=Q'*Q_m$ when the number of transport layers L corresponding to the transport block is 2, $q_0, q_1, \ldots q_Q$ is repeated and the corresponding coded modulation sequence $\underline{q}_0, \underline{q}_1, \ldots \underline{q}_{Q'}$ is obtained according to the corresponding modulation order $Q_m$; as for Channel Quality Indicator (CQI)/Pre-coding Matrix Indication (PMI) information, the corresponding encoded sequence $q_0, q_1, \ldots q_Q$ is obtained according to the encoded target length $Q=Q'^*Q_m$ when the number of transport layers L corresponding to the transport block is 1, and the corresponding coded modulation sequence $\underline{q}_0, \underline{q}_1, \ldots \underline{q}_{Q'}$ is obtained according to the corresponding modulation order $Q_m$ when the transport block does not have data information to be transmitted; the corresponding encoded sequence $q_0, q_1, \ldots q_Q$ is obtained according to the encoded target length $Q=L^*Q'^*Q_m$ when the number of transport layers L corresponding to the transport block is 2, and the corresponding coded modulation sequence $\underline{q}_0, \underline{q}_1, \ldots \underline{q}_{Q'}$ is obtained according to the corresponding modulation order $Q_m$ when the transport block does not have data information to be transmitted.

Wherein, the element in the coding modulation sequence has a length of $L^*Q_m$; the process of coding by adopting linear block codes includes:

$$q_i = \sum_{n=0}^{O-1} (o_n \cdot M_{(i\bmod 32),n}) \bmod 2,$$

where, $i=0, 1, 2, \ldots, Q-1$, O denotes the quantity of feedback information, $M_{(i,n)}$ denotes a value numbered i in basic sequence n, and $O_0, O_1, \ldots, O_{n-1}$ denotes pre-coding information. The disclosure is described by taking $M_{(i,n)}$ as an example which is shown in Table 4, but is not limited to it.

The step of processing the data information corresponding to the one or two transport blocks includes:

CRC with a block length of 24, code block segmentation and CRC with a subblock length of 24 are performed on the data information corresponding to the transport block required to be transmitted, channel coding and rate matching are performed by using Turbo codes with a code rate of ⅓, the target length G of the transport block is calculated according to a corresponding bandwidth, number of symbols, the target length of CQI/PMI information on the transport block and the target length of RI information required to be transmitted on the transport block at the same time, thereby a corresponding encoded data information $f_1, f_1, f_2, f_3, \ldots, f_{G-1}$ is obtained;

the encoded data information $f_0, f_1, f_2, f_3, \ldots, f_{G-1}$ and encoded CQI/PMI information $q_0, q_1, q_2, q_3, \ldots, q_{Q_{CQI}-1}$ are cascaded when the transport block also requires to transmit CQI/PMI information, and a corresponding data/control coded modulation sequence $\underline{g}_0, \underline{g}_1, \underline{g}_2, \underline{g}_3, \ldots, \underline{g}_{H'-1}$ is formed according to a modulation order of the transport block and a number of transport layers corresponding to the transport block, where $H=(G+Q_{CQI})$, and $H'=H/Q_m$;

the corresponding data coded modulation sequence $\underline{g}_0, \underline{g}_1, \underline{g}_2, \underline{g}_3, \ldots, \underline{g}_{H'-1}$ is formed from the encoded data information $f_0, f_1, f_2, f_3, \ldots f_{G-1}$ according to the modulation order and the number of transport layers corresponding to the transport block when the transport block does not need to transmit CQI/PMI information, where $H=G$ and $H'=H/Q_m$.

Step 402, the obtained coded modulation sequence is interleaved, and the interleaved coded modulation sequence is transmitted on a layer corresponding to a PUSCH.

In addition, the disclosure also provides a method for determining a number of code symbols required in each layer when transmitting uplink control information on Physical Uplink Shared Channel (PUSCH), which includes: the number of

TABLE 4

| i | Mi, 0 | Mi, 1 | Mi, 2 | Mi, 3 | Mi, 4 | Mi, 5 | Mi, 6 | Mi, 7 | Mi, 8 | Mi, 9 | Mi, 10 |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 1 | 0 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 0 | 1 | 0 | 1 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 | code symbols required in each layer is determined with the following formula: $Q'=\max(Q',Q'_{min})$, where $Q'_{min}$ can be obtained by any one of the following: $Q'_{min}=\lceil \beta_{offset}^{PUSCH}*\alpha \rceil$, $Q'_{min}=\lceil \alpha \rceil$, $Q'_{min}=\alpha$.

Further, the value of $\alpha$ is one of the following values:
the value of $\alpha$ is configured by a high layer; or $$\alpha = \begin{cases} p, & \beta_{offset}^{PUSCH} >= m \\ q, & \beta_{offset}^{PUSCH} < m, \end{cases}$$

where the values of p, q and m are positive numbers agreed by a base station and a UE; or
the value of $\alpha$ is obtained based on the value of $\beta_{offset}^{PUCCH}$; or
$\alpha=O$; or
$\alpha=c*O/Q_m$, where the value of c is a positive number configured by the high layer or agreed by the base station and the UE, and the value of $Q_m$ is a positive number not being 0 agreed by the base station and the UE or a modulation order corresponding to a transport block.

Further, when there is only one transport block, the value of $Q_m$ is the modulation order corresponding to the transport block; and when there are two transport blocks, the value of $Q_m$ is a smaller one or an average of the modulation orders corresponding to the two transport blocks.

Further, $$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right),$$

or $$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r + Q_{CQI\_MIN}} \right\rceil, 4 \cdot M_{sc}^{PUSCH}\right),$$

or $$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right),$$

or $$Q'' = \min\left(\left\lceil \frac{O \cdot M_{sc}^{PUSCH} \cdot N_{symb}^{PUSCHI} \cdot \beta_{offset}^{PUSCH}}{O_{CQI-MIN}} \right\rceil, 4 \cdot M_{sc}^{PUSCH}\right)$$

Where, $O_{CQI-MIN}$ denotes a number of bits of CQI/PMI information after CRC when the rank of a single downlink cell is 1; O denotes a number of bits of the uplink is control information to be transmitted; $N_{symb}^{PUSCH-initial}$ denotes the number of symbols used in initial PUSCH transmission other than Demodulation Reference Signal (DMRS) and Sounding Reference Signal (SRS); $M_{SC}^{PUSCH-initial}$ denotes a bandwidth during initial PUSCH transmission and is expressed in a number of subcarriers; $M_{SC}^{PUSCH}$ denotes a bandwidth of current subframe for PUSCH transmission and is expressed in a number of subcarriers; $C^{(i)}$ denotes a number of code blocks corresponding to the transport block i after CRC and code block segmentation; $K_r^{(i)}$ denotes a number of bits corresponding to each code block of the transport block i, and the value of i is 1 or 2; $\beta_{offset}^{PUSCH}$ denotes $\beta_{offset}^{HARQ-ACK}$ or $\beta_{offset}^{RI}$, and is configured by a high layer.

Further, the uplink control information is one or more of: ACK/NACK response information and RI information. It should be noted that the above-mentioned method for determining a number of code symbols required in each layer when transmitting uplink control information on PUSCH is applicable to the case in which the number of bits of the uplink control information is greater than 2 and also applicable to the case in which the number of bits of the uplink control information is not limited.

The method for transmitting uplink control information according to the disclosure is further described in conjunction with embodiments.

In Embodiment 1 of the disclosure, supposing one transport block is configured, data are transmitted in this transport block, the transport block corresponds to one transmission layer during transmission, the uplink control information required to be is transmitted by the current subframe is $[O_0^{ACK}, O_1^{ACK}, \ldots O_{19}^{ACK}]$ the current subframe is normal Cyclic Prefix (CP), the columns of the virtual matrix are numbered starting from 0, and no SRS needs to be transmitted. The method for transmitting uplink control information mainly includes the steps below.

Step 1, ACK/NACK information $o_0^{ACK}, o_1^{ACK}, \ldots o_{19}^{ACK}$ is divided into two parts $o_0^{ACK0}, o_1^{ACK0}, \ldots o_9^{ACK0}$ and $o_0^{ACK1}, o_1^{ACK1}, \ldots o_9^{ACK1}$ and a number of code symbols $Q'_0$, $Q'_1$ required to transmit the uplink control information is calculated; $o_0^{ACK0}, o_1^{ACK0}, \ldots o_9^{ACK0}$ and $o_0^{ACK1}, o_1^{ACK1}, \ldots o_9^{ACK1}$ are coded respectively by using linear block code, the encoded sequences $q_0^{ACK0}, q_1^{ACK0}, \ldots q_{Q_0}^{ACK0}$ and $q_0^{ACK1}, q_1^{ACK1}, \ldots q_{Q_1}^{ACK1}$ corresponding to $o_0^{ACK0}, o_1^{ACK0}, \ldots o_9^{ACK0}$ and $o_0^{ACK1}, o_1^{ACK1}, \ldots o_9^{ACK1}$ are obtained according to encoded target lengths $Q_0$, $Q_1$, $q_0, q_1, \ldots q_Q$ is obtained after cascading of $q_0^0, q_1^0, \ldots q_{Q_0}^0$ and $q_0^1, q_1^1, \ldots q_{Q_1}^1$, and then coded modulation sequence $q_0, q_1, \ldots q_{Q'}$ is obtained according to a modulation order.

The data information corresponding to the transport block is coded; a bit sequence of encoded transport block $f_0, f_1, f_2, \ldots, f_{G-1}$ is obtained according to the target length G; and then the coded modulation sequence corresponding to the transport block is $g_0, g_1, g_2, g_3, \ldots, g_{H'-1}$.

Step 2, the obtained coded modulation sequence $q_0, q_1, \ldots q_{Q'}$ corresponding to the ACK/NACK information and the coded modulation sequence $g_0, g_1, g_2, g_3, \ldots, g_{H'-1}$ corresponding to the transport block are interleaved and then are transmitted on the layer corresponding to the PUSCH.

In Embodiment 2 of the disclosure, supposing one transport block is configured, data are transmitted on this transport block, the transport block corresponds to two transmission layers during transmission, the corresponding modulation order is $Q_m=2$ during transmission, the uplink control information required to be transmitted by the current subframe is $[O_0^{ACK}, O_1^{ACK}, \ldots O_{19}^{ACK}]$, the current subframe is the normal CP, the columns of the virtual matrix are numbered starting from 0, and no SRS needs to be transmitted. The method for transmitting uplink control information mainly includes the steps below.

Step 1, ACK/NACK information $o_0^{ACK}, o_1^{ACK}, \ldots o_{19}^{ACK}$ is divided into two parts $o_0^{ACK0}, o_1^{ACK0}, \ldots o_9^{ACK0}$ and $o_0^{ACK1}, o_1^{ACK1}, \ldots o_0^{ACK1}$, and the number of code symbols $Q'_0, Q'_1$, required to transmit the uplink control information is calculated; $o_0^{ACK0}, o_1^{ACK0}, \ldots o_9^{ACK0}$ and $o_0^{ACK1}, o_1^{ACK1}, \ldots o_9^{ACK1}$ are coded respectively by using the linear block code, the encoded sequences $q_0^{ACK0}, q_1^{ACK0}, \ldots q_{Q_0}^{ACK0}$ and $q_0^{ACK1}, q_1^{ACK1}, \ldots q_{Q_1}^{ACK1}$ corresponding $o_0^{ACK0}, o_1^{ACK0}, \ldots o_9^{ACK0}$ and $o_0^{ACK1}, o_1^{ACK1}, \ldots o_0^{ACK1}$ are obtained according to encoded target lengths $Q_0, Q_1, q_0^{ACK}, q_1^{ACK}, \ldots q_Q^{ACK}$ is obtained after cascading of $q_0^{ACK0}, q_1^{ACK0}, \ldots q_{Q_0}^{ACK0}$ and $q_0^{ACK1}, q_1^{ACK1}, \ldots q_{Q_1}^{ACK1}, q_0^{ACK}$, $q_1^{ACK}, \ldots q_Q^{ACK}$ is repeated, and then the coded modulation sequence $q_0^{ACK}, q_1^{ACK}, \ldots q_{Q'}^{ACK}$ is obtained according to the modulation order where $q_k^{ACK} = [q_i^{ACK} q_{i+Q_m-1}^{ACK} q_i^{ACK} q_{i+Q_m-1}^{ACK}]$, where $k=0, 1, 2, \ldots, Q'$, $i=i+Q_m$.

The data information corresponding to the transport block is coded; the bit sequence $f_0, f_1, f_2, \ldots, f_{G-1}$ of encoded transport block is obtained according to the target length G; and then the coded modulation sequence corresponding to the transport block is $g_0, g_1, g_2, g_3, \ldots, g_{H'-1}$.

Alternatively, Step 1 may also adopt the following mode: ACK/NACK information $o_0^{ACK}, o_1^{ACK}, \ldots o_{19}^{ACK}$ is divided into two parts $o_0^{ACK0}, o_1^{ACK0}, \ldots o_9^{ACK0}$ and $o_0^{ACK1}, o_1^{ACK1}, \ldots o_9^{ACK1}$, $Q'_0, Q'_1$ required to transmit the uplink control information is calculated; $o_0^{ACK0}, o_1^{ACK0}, \ldots o_9^{ACK0}$ and $o_0^{ACK1}, o_1^{ACK1}, \ldots o_9^{ACK1}$ are coded respectively by using the linear block code, the encoded sequences $q_0^{ACK0}, q_1^{ACK0}, \ldots q_{Q_0}^{ACK0}$ and $q_0^{ACK1}, q_1^{ACK1}, \ldots q_{Q_1}^{ACK1}$ corresponding to $o_0^{ACK0}, o_1^{ACK0}, \ldots o_9^{ACK0}$ and $o_0^{ACK1}, o_1^{ACK1}, \ldots o_9^{ACK1}$ are obtained according to the encoded target lengths $Q_0, Q_1$, the corresponding coded modulation sequences $q_0^{ACK0}, q_1^{ACK0}, \ldots q_{Q'_0}^{ACK0}$ and $q_0^{ACK1}, q_1^{ACK1}, \ldots q_{Q'_1}^{ACK1}$ are obtained according to the modulation order, $q_0^{ACK0}, q_1^{ACK0}, \ldots q_{Q'_0}^{ACK0}$ and $q_0^{ACK1}, q_1^{ACK1}, \ldots q_{Q'_1}^{ACK1}$ are repeated respectively, and then the coding modulation sequence $q_0^{ACK}, q_1^{ACK}, \ldots q_{Q'}^{ACK}$ is formed, where $q_k^{ACK} = [q_k^{ACKm} q_k^{ACKm}]$, where $k=0, 1, 2, \ldots, q'$, $m=0,1$.

The data information corresponding to the transport block is coded; the bit sequence $f_0, f_1, f_2, \ldots, f_{G-1}$ of encoded transport block is obtained according to the target length G; and then the coded modulation sequence corresponding to the transport block is $g_0, g_1, g_2, g_3, \ldots, g_{H'-1}$.

Step 2, the obtained coded modulation sequence $q_0, q_1, \ldots q_{Q'}$ corresponding to ACK/NACK information and the coded modulation sequence $g_0, g_1, g_2, g_3, \ldots, g_{H'-1}$ corresponding to the transport block are interleaved and then are transmitted on the layer corresponding to the PUSCH.

In Embodiment 3 of the disclosure, supposing two transport blocks $TB_0, TB_1$ are configured; data are transmitted on both transport blocks, and the transport blocks correspond to two transmission layers during transmission; the UE obtains, according to a uplink indication, the bandwidth which is allocated for PUSCH transmission by the base station is one RB, and obtains the MCS $I_{MCS_1}, I_{MCS_2}$ of the two transport blocks; according to $I_{MCS_1}, I_{MCS_2}$ and the number of transport blocks, the UE can obtain that the size of the corresponding transport blocks is 120 and 224 respectively, and the modulation order is $Q_m^0=2$, $Q_m^1=2$; After 24 bits of CRC being added to the transport blocks respectively and code block segmentation, the number of code blocks of each transport block is $C^0=1, C^1=1$ and the size of the code block is $K_r^0=144$, $K_r^1=248$; the $\beta_{offset}^{PUSCH} = \beta_{offset}^{HARQ-ACK} = 2$, $Q'_{min} = \alpha$ are configured; the value of $\alpha$ configured by a high layer is selected from $$\left\{0, \frac{3O}{Q_m}, \frac{32}{Q_m}, \frac{2O}{Q_m}, \frac{3O}{2Q_m}, \frac{O}{Q_m}, \frac{f(O)O}{Q_m}\right\},$$

where $f(O) = \{1,1,1,5/4,6/5,11/6,11/7,11/8,11/9,11/10,17/11\}$ however, other values configured by the high layer may not be excluded; supposing the $\alpha$ configured by the current base station is $$\alpha = \frac{32}{Q_m} = 16,$$

then $Q'_{min} = 16$; the uplink control information required to be transmitted is $[O_0^{ACK}, O_1^{ACK}, \ldots O_9^{ACK}]$; the current subframe is normal CP; the columns of the virtual matrix are coded starting from 0; no SRS is required to be transmitted; the formula for calculating the number of code symbols required in each layer when transmitting ACK/NACK information on the PUSCH is:

$$Q' = \max(Q'', Q'_{min}) = \max\left(Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right), Q'_{min}\right) = \max(8, 16) = 16.$$

In Embodiment 4 of the disclosure, supposing two transport blocks $TB_0, TB_1$ are configured; data are transmitted on both transport blocks, and the transport blocks correspond to two transmission layers during transmission; the UE obtains, according to a uplink indication, the bandwidth which is allocated for PUSCH transmission by the base station is one RB, and obtains the MCS $I_{MCS_1}, I_{MCS_2}$ of the two transport blocks; according to $I_{MCS_1}, I_{MCS_2}$ and the number of transport blocks, the UE can obtain that the size of the corresponding transport blocks is 120 and 224 respectively, and the modulation order is $Q_m^0=2$, $Q_m^1=2$; After 24 bits of CRC being added to the transport blocks respectively and code block segmentation, the number of code blocks of each transport block is $C^0=1, C^1=1$ and the size of the code blocks is $K_r^0=144$, $K_r^1=248$; the $\beta_{offset}^{PUSCH} = \beta_{offset}^{HARQ-ACK} = 2$, $Q'_{min} = \lceil \beta_{offset}^{PUSCH} * \alpha \rceil$ are configured, where $$\alpha = \begin{cases} p, & \beta_{offset}^{PUSCH} >= m \\ q, & \beta_{offset}^{PUSCH} < m; \end{cases}$$

the UE and the base station agree that $m=4$, $p=1, q=20$; $\beta_{offset}^{PUSCH} = 2$, which is smaller than $m=4$, so $\alpha=20$ then $Q'_{min}=20$; the uplink control information required to be transmitted is $[O_0^{ACK}, O_1^{ACK}, \ldots O_9^{ACK}]$; the current subframe is normal CP; the columns of the virtual matrix are numbered starting from 0; no SRS is required to be transmitted; and the formula for calculating the number of code symbols required in each layer when transmitting ACK/NACK information on the PUSCH is:

$$Q' = \max(Q'', Q'_{min}) = \max\left(Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right), Q'_{min}\right) = \max(8, 20) = 20.$$

In Embodiment 5 of the disclosure, supposing two transport blocks $TB_0, TB_1$, are configured; data are transmitted on both transport blocks; the transport blocks correspond to two transmission layers during transmission; the UE obtains, according to a uplink indication, the bandwidth which is allocated for PUSCH transmission by the base station is one RB, and obtains the MCS $I_{MCS_1}, I_{MCS_2}$ of the two transport blocks; according to $I_{MCS_1}, I_{MCS_2}$ and the number of transport blocks, the UE can obtain that the size of the corresponding transport blocks is 120 and 224 respectively, and the modulation order is $Q_m^0=2$, $Q_m^1=2$; After 24 bits of CRC being added to the transport blocks respectively and code block segmentation, the number of code blocks of each transport block is $C^0=1$, $C^1=1$ and the size of the code blocks is $K_r^0=144$, $K_r^1=248$; the $\beta_{offset}^{PUSCH}=\beta_{offset}^{HARQ-ACK}=2$ is configured, and $Q'_{min}=\lceil \beta_{offset}^{PUSCH} * \alpha \rceil$ is configured; and the value of $\alpha$ is obtained from $\beta_{offset}^{PUSCH}$, and the values of $\alpha$ and $\beta_{offset}^{PUSCH}$ are as shown in Table 5. The disclosure only takes Table 5 as an example, but of course other values of $\alpha$ and $\beta_{offset}^{PUSCH}$ may not be excluded.

TABLE 5

| $\beta_{offset}^{HARQ-ACK}$ | $\alpha$ |
|---|---|
| 2.000 | 20.000 |
| 2.500 | 20.000 |
| 3.125 | 20.000 |
| 4.000 | 20.000 |
| 5.000 | 10.000 |
| 6.250 | 10.000 |
| 8.000 | 10.000 |
| 10.000 | 10.000 |
| 12.625 | 5.000 |
| 15.875 | 5.000 |
| 20.000 | 5.000 |
| 31.000 | 0.000 |
| 50.000 | 0.000 |
| 80.000 | 0.000 |
| 126.000 | 0.000 |

The uplink control information required to be transmitted is $[O_0^{ACK}, O_1^{ACK}, \ldots O_9^{ACK}]$; the current subframe is normal CP; the columns of the virtual matrix are numbered starting from 0; no SRS is required to be transmitted; and the formula for calculating the number of code symbols required in each layer when transmitting the ACK/NACK information on the PUSCH is:

$$Q' = \max(Q'', Q'_{min}) = \max\left( Q'' = \min\left( \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right), Q'_{min} \right) = \max(8, 40) = 40.$$

In Embodiment 6 of the disclosure, supposing two transport blocks $TB_0, TB_1$, are configured; data are transmitted on both transport blocks, the transport blocks correspond to two transmission layers during transmission; UE obtains, according to a uplink indication, that the bandwidth which is allocated for PUSCH transmission by the base station is one RB, and obtains the MCS $I_{MCS_1}, I_{MCS_2}$ of the two transport blocks; according to $I_{MCS_1}, I_{MCS_2}$ and the number of transport blocks, the UE can obtain that the size of the corresponding transport blocks is 120 and 224 respectively, and the modulation order is $Q_m^0=2$, $Q_m^1=2$; After 24 bits of CRC being added to the transport blocks respectively and code block segmentation, the number of code blocks of each transport block is $C^0=1$, $C^1=1$ and the size of the code blocks is $K_r^0=144$, $K_r^1=248$; the $\beta_{offset}^{PUSCH}=\beta_{offset}^{HARQ-ACK}=2$, $Q'_{min}=\lceil \beta_{offset}^{PUSCH} * \alpha \rceil$ are configured, where the high layer configures $\alpha=3$; the uplink control information required to be transmitted is $[O_0^{ACK}, O_1^{ACK}, \ldots O_9^{ACK}]$; the current subframe is normal CP; the columns of the virtual matrix are numbered starting from 0, and no SRS is required to be transmitted; and the formula for calculating the number of code symbols required in each layer when transmitting the ACK/NACK information on the PUSCH is:

$$Q' = \max(Q'', Q'_{min}) = \max\left( Q'' = \min\left( \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right), Q'_{min} \right) = \max(8, 6) = 8.$$

In Embodiment 7 of the disclosure, supposing two transport blocks $TB_0, TB_1$, are configured; data are transmitted on both transport blocks; the transport blocks correspond to two transmission layers during transmission; the UE obtains, according to a uplink indication, that the bandwidth which is allocated for PUSCH transmission by the base station is one RB, and obtains the MCS $I_{MCS_1}, I_{MCS_2}$ of the two transport blocks; according to $I_{MCS_1}, I_{MCS_2}$ and the number of transport blocks, the UE can obtain that the size of the corresponding transport blocks is 120 and 224 respectively, and the modulation order is $Q_m^0=2$, $Q_m^1=2$; After 24 bits of CRC being added the transport blocks respectively and code block segmentation, the number of code blocks of each transport block is $C^0=1$, $C^1=1$ and the size of the code blocks is $K_r^0=144$, $K_r^1=248$; the $\beta_{offset}^{PUSCH}=\beta_{offset}^{HARQ-ACK}=2$, $Q'_{min}=\lceil \beta_{offset}^{PUSCH} * \alpha \rceil$ are configured, where a=O=10; the uplink control information required to be transmitted is $[O_0^{ACK}, O_1^{ACK}, \ldots O_9^{ACK}]$; the current subframe is normal CP; the columns of the virtual matrix are numbered starting from 0; no SRS is required be transmitted; and the formula for calculating the number of code symbols required in each layer when transmitting the ACK/NACK information on the PUSCH is:

$$Q' = \max(Q'', Q'_{min}) = \max\left( Q'' = \min\left( \left\lceil \frac{O \cdot M_{sc}^{PUSCH\text{-}initial} \cdot N_{symb}^{PUSCH\text{-}initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right), Q'_{min} \right) = \max(8, 20) = 20.$$

In Embodiment 8 of the disclosure, supposing two transport blocks $TB_0, TB_1$ are configured; data are transmitted on both transport blocks, and the transport blocks correspond to two transmission layers during transmission; the UE obtains, according to a uplink indication, that the bandwidth which is allocated for PUSCH transmission by the base station is one RB, and obtains the MCS $I_{MCS_1}, I_{MCS_2}$ of the two transport blocks; according to $I_{MCS_1}, I_{MCS_2}$ and the number of transport blocks, the UE can obtain that the size of the corresponding transport blocks is 120 and 224 respectively, and the modulation order is $Q_m^0=2$, $Q_m^1=2$; After 24 bits of CRC being added to the transport blocks respectively and code block segmentation, the number of code blocks of each transport block is $C^0=1$, $C^1=1$ and the size of the code blocks is $K_r^0=144$, $K_r^1=248$; the $\beta_{offset}^{PUSCH}=\beta_{offset}^{HARQ-ACK}=2$, $Q'_{min}=\lceil \alpha \rceil$ are configured, where $$\alpha = \frac{c*O}{Q_m};$$

the base station and the UE agree c=3; $Q_m$ is the minimum value of the code modulation orders of two transport blocks, namely $Q_m=2$; the uplink control information required to be transmitted is $[O_0^{ACK}, O_1^{ACK}, \ldots O_9^{ACK}]$; the current subframe is normal CP; the columns of the virtual matrix are numbered starting from 0; no SRS is required to be transmitted; and the formula for calculating the number of code symbols required in each layer when transmitting ACK/NACK information on the PUSCH is:

$$Q' = \max(Q'', Q'_{min}) = \max\left\{Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right), Q'_{min}\right\} = \max(8, 16) = 16.$$

Corresponding to the above-mentioned method for transmitting uplink control information, the disclosure also provides a system for transmitting uplink control information, which includes: a code modulation module and an interleaving and transmitting module. The code modulation module is configured to code the uplink control information required to be transmitted and data information corresponding to one or two transport blocks respectively, obtain an encoded sequence according to a target length, and form a corresponding coded modulation sequence from the encoded sequence according to a modulation mode. The interleaving and transmitting module is configured to interleave the obtained coded modulation sequence, and transmit the interleaved coded modulation sequence on a layer corresponding to the PUSCH.

Wherein, the uplink control information is processed by the code modulation module in one or more of the following two modes:

Mode 1, the uplink control information $o_0, o_1, \ldots o_{N-1}$ (N>11) required to be transmitted is divided into two parts $o_0^0, o_1^0, \ldots o_{ceil(N/2)-1}^0$ and $o_0^1, o_1^1, \ldots o_{N-ceil(N/2)-1}^1$; the number of code symbols $Q'_0, Q'_1$ a required to transmit the uplink control information is calculated; $o_0^0, o_1^0, \ldots o_{ceil(N/2)-1}^0$ and $o_0^1, o_1^1, \ldots o_{N-ceil(N/2)-1}^1$ are coded respectively, by using linear block code, and the coded modulation sequence corresponding to the uplink control information is obtained according to encoded target lengths $Q_0=Q'_0*Q_m$, $Q_1=Q'_1*Q_m$, a modulation order $Q_m$ corresponding to the transport block and a number of transmission layers L corresponding to the transport block.

Further, the number of code symbols required to transmit the uplink control information may be calculated by any of the following ways:

1, the number of code symbols $Q'_0$, $Q'_1$ a required in each layer are calculated according to a number of bits ceil(N/2) corresponding to $o_0^0, o_1^0, \ldots o_{ceil(N/2)-1}$ and a number of bits N−ceil(N/2) corresponding to $o_0^1, o_1^1, \ldots o_{N-ceil(n/2)-1}^1$;

2, the number of code symbols Q' required is calculated according to N when the number of bits N corresponding to $o_0, o_1, \ldots o_{N-1}$ is even, the number of code symbols Q' required is calculated according to N+1 when the number of bits N corresponding to $o_0, o_1, \ldots o_{N-1}$ is odd, then the number of code symbols $Q'_0$ required in each layer for transmitting $o_0^0, o_1^0, \ldots o_{ceil(N/2)-1}^0$ equals to Q'/2, and the number of code symbols a required in each layer for transmitting $o_0^1, o_1^1, \ldots o_{N-ceil(N/2)-1}^1$ equals to Q'/2.

Further, the step of obtaining the coded modulation sequence corresponding to the uplink control information according to the encoded target lengths $Q_0=Q'_0*Q_m$ and $Q_1=Q'_1*Q_m$, the modulation order $Q_m$ corresponding to the transport block and the number of transport layers L corresponding to the transport block can be implemented by adopting any one of the following ways:

1, the encoded sequences $q_0^0, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively, according to the encoded target lengths $Q_0$ and $Q_1$; $q_0, q_1, \ldots q_Q$ is obtained by cascading of $q_0^0, q_1^0, \ldots q_{Q_0}^0$ and $q_0^1, q_1^1, \ldots q_{Q_1}^1$ when the number of transport layers L corresponding to the transport block is 1, and then the coded modulation sequence $q_0, q_1, \ldots q_{Q'}$ is formed according to the modulation order $Q_m$; and $q_0, q_1, \ldots q_Q$ is obtained by cascading of $q_0^0, q_1^0, \ldots q_{Q_0}^0$ and $q_0^1, q_1^1, \ldots q_{Q_1}^1$ when the number of transport layers L corresponding to the transport block is 2, and $q_0, q_1, \ldots q_Q$ is repeated, and the coded modulation sequence $q_0, q_1, \ldots q_{Q'}$ is formed according to the modulation order $Q_m$;

2. the encoded sequences $q_0^1, q_1^0, \ldots q_{Q_0}^1$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively according to the encoded target lengths $Q_0$, $Q_1$, the corresponding coded modulation sequences $q_0^0, q_1^0, \ldots q_{Q'_0}^0$ and $q_0^1, q_1^1, \ldots q_{Q'_1}^1$ are formed according to the modulation order $Q_m$, $q_0, q_1, \ldots q_{Q'}$ is obtained by cascading of $q_0^0, q_1^0, \ldots q_{Q'_0}^0$ and $q_0^1, q_1^1, \ldots q_{Q'_1}^1$ when the number of transport layers L corresponding to the transport block is 1; and $q_0, q_1, \ldots q_{Q'}$ is obtained by respectively repeating and then cascading of $q_0^0, q_1^0, \ldots q_{Q'_0}^0$ and $q_0^1, q_1^1, \ldots q_{Q'_1}^1$ when the number of transport layers L corresponding to the transport block is 2;

3. the encoded sequences $q_0^1, q_1^1, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{N-ceil(N/2)-1}^1$ are obtained respectively according to the encoded target length $Q_0$, $Q_1$, the coded modulation sequence $q_0, q_1, \ldots q_{Q'}$ is formed from $q_0^0, q_1^0, \ldots q_{Q_0}^0$ and $q_0^1, q_1^1, \ldots q_{Q_1}^1$ when the number of transport layers L corresponding to the transport block is 1, and the coded modulation sequence $q_0, q_1, \ldots q_{Q'}$ is formed by respectively repeating and then cascading of $q_0^0, q_1^0, \ldots q_{Q_0}^0$ and $q_0^1, q_1^1, \ldots q_{Q_1}^1$ when the number of transport layers L corresponding to the transport block is 2.

It should be noted that the uplink control information is one or more of: ACK/NACK information and RI information.

Mode 2, a number of code symbols Q' required to transmit the uplink control information $o_0,o_1,\ldots o_{N-1}$ (wherein N is greater than 11) is calculated, $o_0,o_1,\ldots o_{N-1}$ is coded by using a tail-biting convolutional code with a length of 7 and a code rate of 1/3 (as shown in FIG. 3), or by conducting Cyclic Redundancy Check (CRC) with a length of 8 before the coding; as for ACK/NACK response information and RI information, the corresponding encoded sequence $q_0,q_1,\ldots q_Q$ is obtained according to the encoded target length $Q=Q'*Q_m$ and the corresponding coded modulation sequence $\underline{q}_0,\underline{q}_1,\ldots \underline{q}_{Q'}$ is obtained according to a corresponding modulation order $Q_m$ when a number of transport layers L corresponding to a transport block is 1; and the corresponding encoded sequence $q_0,q_1,\ldots q_Q$ is obtained according to the encoded target length $Q=Q'*Q_m$ when the number of transport layers L corresponding to the transport block is 2, $q_0,q_1,\ldots q_Q$ is repeated and the corresponding coded modulation sequence $\underline{q}_0,\underline{q}_1,\ldots \underline{q}_{Q'}$ is obtained according to the corresponding modulation order $Q_m$; as for Channel Quality Indicator (CQI)/Pre-coding Matrix Indication (PMI) information, the corresponding encoded sequence $q_0,q_1,\ldots q_Q$ is obtained according to the encoded target length $Q=Q'*Q_m$ when the number of transport layers L corresponding to the transport block is 1, and the corresponding coded modulation sequence $\underline{q}_0,\underline{q}_1,\ldots \underline{q}_{Q'}$ is obtained according to the corresponding modulation order $Q_m$ when the transport block does not have data information to be transmitted; the corresponding encoded sequence $q_0,q_1,\ldots q_Q$ is obtained according to the encoded target length $Q=L*Q'*Q_m$ when the number of transport layers L corresponding to the transport block is 2, and the corresponding coded modulation sequence $\underline{q}_0,\underline{q}_1,\ldots \underline{q}_{Q'}$ is obtained according to the corresponding modulation order $Q_m$ when the transport block does not have data information to be transmitted.

The step of processing the data information corresponding to one or two transport blocks includes:

CRC with a block length of 24, code block segmentation and CRC with a subblock length of 24 are performed on the data information corresponding to the transport block required to be transmitted, channel coding and rate matching are performed by using Turbo codes with a code rate of 1/3, the target length G of the transport block is calculated according to a corresponding bandwidth, number of symbols, the target length of CQI/PMI information on the transport block and the target length of RI information required to be transmitted on the transport block at the same time, thereby a corresponding encoded data information $f_0,f_1,f_2,f_3,\ldots,f_{G-1}$ is obtained;

when the transport block also requires to transmit CQI/PMI information, then the encoded data information $f_0,f_1,f_2,f_3,\ldots,f_{G-1}$ and encoded CQI/PMI information $q_0,q_1,q_2,q_3,\ldots,q_{Q_{CQI}-1}$ are cascaded, and a corresponding data/control coded modulation sequence $g_0,g_1,g_2,g_3,\ldots,g_{H'-1}$ is formed according to a modulation order of the transport block and a number of transport layers corresponding to the transport block, where $H=(G+Q_{CQI})$, and a length of the corresponding data/control coded modulation sequence $H'=H/Q_m$.

when the transport block does not need to transmit CQI/PMI information, then the corresponding data coded modulation sequence $g_0,g_1,g_2,g_3,\ldots,g_{H'-1}$ is formed from the encoded data information $f_0,f_1,f_2,f_3,\ldots,f_{G-1}$ according to the modulation order and the number of transport layers corresponding to the transport block, where $H=G$ and the length of the corresponding control coded modulation sequence $H'=H/Q_m$.

Corresponding to the above-mentioned method for determining a number of code symbols required in each layer when transmitting uplink control information on PUSCH provided by the disclosure, the disclosure also provides an apparatus for determining a number of code symbols required in each layer when transmitting uplink control information on PUSCH, which includes: a module for determining the number of code symbols and a parameter determination module; wherein the module for determining the number of code symbols is configured to determine the number of code symbols required in each layer with the following formula: $Q'=\max(Q'',Q'_{min})$; and the parameter determination module is configured to determine $Q'_{min}=\lceil \beta_{offset}^{PUSCH}*\alpha \rceil$, or $Q'_{min}=\lceil \alpha \rceil$, or $Q'_{min}=\alpha$ where $\lceil\ \rceil$ represents ceil, and $\beta_{offset}^{PUSCH}$ is an offset corresponding to the uplink control information and the value is configured by high-layer signaling.

All those described above are only preferred embodiments of the disclosure and are not intended to limit the scope of the disclosure.

What is claimed is:

1. A method for transmitting uplink control information on a Physical Uplink Shared Channel (PUSCH) with spatial multiplexing, comprising:
   coding the uplink control information required to be transmitted and data information corresponding to one or two transport blocks respectively, obtaining an encoded sequence according to a target length, and forming a corresponding coded modulation sequence from the encoded sequence according to a modulation order corresponding to the transport block and a number of transport layers corresponding to the transport block;
   interleaving the obtained coded modulation sequence, and transmitting the interleaved coded modulation sequence on a layer corresponding to the PUSCH with spatial multiplexing;
   wherein the step of coding the uplink control information required to be transmitted, obtaining the encoded sequence according to the target length, and forming the corresponding coded modulation sequence from the encoded sequence according to the modulation order corresponding to the transport block and the number of transport layers corresponding to the transport block comprises:
   dividing the uplink control information $o_0,o_1,\ldots o_{N-1}$ required to be transmitted into two parts $o_0^0,o_1^0,\ldots o_{ceil(N/2)-1}^0$ and $o_0^1,o_1^1,\ldots o_{ceil(N/2)-1}^1$, where N denotes a number of bits of the uplink control information which is greater than 11;
   determining a number of coded symbols $Q'_0, Q'_1$ required to transmit the uplink control information;
   coding $o_0^0,o_1^0,\ldots o_{ceil(N/2)-1}^0$ and $o_0^1,o_1^1,\ldots o_{ceil(N/2)-1}^1$, respectively, by using linear block code, and obtaining the coded modulation sequence corresponding to the uplink control information according to the encoded target lengths $Q_0=Q'_0*Q_m$ and $Q_1=Q'_1*Q_m$, a modulation order $Q_m$ corresponding to the transport block and a number of transport layers L corresponding to the transport block; wherein the uplink control information is one or more of: Acknowledgement/Negative Acknowledgement (ACK/NACK) information and Rank Indication (RI) information.

2. The method according to claim 1, wherein the step of determining the number of code symbols $Q'_0, Q'_1$ required to transmit the uplink control information comprises:
   calculating the number of coded symbols $Q'_0, Q'_1$ required in each layer according to a number of bits ceil(N/2)

corresponding to $o_0^0, o_1^0, \ldots o_{ceil(N/2)-1}^0$ and a number of bits N–ceil(N/2) corresponding to $o_0^1, o_1^1, \ldots o_{ceil(N/2)-1}^1$.

3. The method according to claim 1, wherein the step of determining the number of code symbols $Q'_0$, $Q'_1$ required to transmit the uplink control information comprises:

calculating the number of coded symbols $Q'$ required according to N when the number of bits N corresponding to $o_0, o_1, \ldots o_{N-1}$ is even, calculating the number of coded symbols $Q'$ required according to N+1 when the number of bits N corresponding to $o_0, o_1, \ldots o_{N-1}$ is odd, then the number of coded symbols $Q'_0$ required in each layer for transmitting $o_0^0, o_1^0, \ldots o_{ceil(N/2)-1}^0$ equals to $Q'/2$, and the number of coded symbols $Q'_1$ required in each layer for transmitting $o_0^1, o_1^1, \ldots o_{ceil(N/2)-1}^1$ equals to $Q'/2$.

4. The method according to claim 1, wherein the step of obtaining the coded modulation sequence corresponding to the uplink control information according to the encoded target lengths $Q_0 = Q'_0 * Q_m$ and $Q_1 = Q'_1 * Q_m$, the modulation order $Q_m$ corresponding to the transport block and the number of transport layers L corresponding to the transport block comprises:

obtaining the encoded sequences $q_0^0, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{ceil(N/2)-1}^1$, respectively, according to the encoded target lengths $Q_0$ and $Q_1$;

obtaining $q_0, q_1, \ldots q_Q$ by cascading of $q_0^0, q_1^0, \ldots q_{Q_0}^0$ and $q_0^1, q_1^1, \ldots q_{Q_1}^1$ when the number of transport layers L corresponding to the transport block is 1, and then forming the coded modulation sequence $\underline{q}_0, \underline{q}_1, \ldots \underline{q}_Q$ according to the modulation order $Q_m$; and obtaining $q_0, q_1, \ldots q_Q$ by cascading of $q_0^0, q_1^0, \ldots q_{Q_0}^0$ and $q_0^1, q_1^1, \ldots q_{Q_1}^1$ when the number of transport layers L corresponding to the transport block is 2, and repeating $q_0, q_1, \ldots q_Q$, and forming the code modulation sequence $\underline{q}_0, \underline{q}_1, \ldots \underline{q}_Q$ according to the modulation order $Q_m$.

5. The method according to claim 1, wherein the step of obtaining the coded modulation sequence corresponding to the uplink control information according to the encoded target lengths $Q_0 = Q'_0 * Q_m$ and $Q_1 = Q'_1 * Q_m$, the modulation order $Q_m$ corresponding to the transport block and the number of transport layers L corresponding to the transport block comprises:

obtaining the encoded sequences $q_0^0, q_1^0, \ldots q_{Q_0}^0$ and $q_0^1, q_1^1, \ldots, q_{Q_1}^1$ corresponding to $o_0^0, o_1^0, \ldots o_{ceil(N/2)-1}^0$ and $o_0^1, o_1^1, \ldots o_{ceil(N/2)-1}^1$, respectively, according to the encoded target lengths $Q_0$, $Q_1$, forming the corresponding coded modulation sequences $\underline{q}_0^0, \underline{q}_1^0, \ldots \underline{q}_{Q'_0}^0$ and $\underline{q}_0^1, \underline{q}_1^1, \ldots \underline{q}_{Q'_1}^1$ according to the modulation order $Q_m$, obtaining $\underline{q}_0, \underline{q}_1, \ldots \underline{q}_{Q'}$ by cascading of $\underline{q}_0^0, \underline{q}_1^0, \ldots \underline{q}_{Q'_0}^0$ and $\underline{q}_0^1, \underline{q}_1^1, \ldots, \underline{q}_{Q'_1}^1$ when the number of transport layers L corresponding to the transport block is 1, and obtaining $\underline{q}_0, \underline{q}_1, \ldots \underline{q}_{Q'}$ by respectively repeating and then cascading of $\underline{q}_0^0, \underline{q}_1^0, \ldots, \underline{q}_{Q'_0}^0$ and $\underline{q}_0^1, \underline{q}_1^1, \ldots \underline{q}_{Q'_1}^1$ when the number of transport layers L corresponding to the transport block is 2.

6. The method according to claim 1, wherein the step of obtaining the coded modulation sequence corresponding to the uplink control information according to the encoded target lengths $Q_0 = Q'_0 * Q_m$ and $Q_1 = Q'_1 * Q_m$, the modulation order $Q_m$ corresponding to the transport block and the number of transport layers L corresponding to the transport block comprises:

obtaining the encoded sequences $q_0^0, q_1^0, \ldots q_{Q_0}^0$ and $q_0^1, q_1^1, \ldots q_{Q_1}^1$ corresponding to $o_0^0, o_1^0, \ldots o_{ceil(N/2)-1}^0$ and $o_0^1, o_1^1, \ldots o_{ceil(N/2)-1}^1$, respectively, according to the encoded target lengths $Q_0$, $Q_1$, forming the coded modulation sequence $\underline{q}_0, \underline{q}_1, \ldots \underline{q}_{Q'}$ from $q_0^0, q_1^0, \ldots q_{Q_0}^0$ and $q_0^1, q_1^1, \ldots q_{Q_1}^1$ when the number of transport layers L corresponding to the transport block is 1, and forming the coded modulation sequence $\underline{q}_0, \underline{q}_1, \ldots \underline{q}_{Q'}$ by respectively repeating and then cascading of $q_0^0, q_1^0, \ldots q_{Q_0}^0$ and $q_0^1, q_1^1, \ldots q_{Q_1}^1$ when the number of transport layers L corresponding to the transport block is 2.

7. A method for transmitting uplink control information on a Physical Uplink Shared Channel (PUSCH) with spatial multiplexing, comprising:

coding the uplink control information required to be transmitted and data information corresponding to one or two transport blocks respectively, obtaining an encoded sequence according to a target length, and forming a corresponding coded modulation sequence from the encoded sequence according to a modulation order corresponding to the transport block and a number of transport layers corresponding to the transport block;

interleaving the obtained coded modulation sequence, and transmitting the interleaved coded modulation sequence on a layer corresponding to the PUSCH with spatial multiplexing;

wherein the step of coding the uplink control information required to be transmitted, obtaining the coded sequence according to the target length, and forming the corresponding coded modulation sequence from the coded sequence according to the modulation order corresponding to the transport block and the number of transport layers corresponding to the transport block comprises:

calculating a number of coded symbols $Q'$ required to transmit the uplink control information $o_0, o_1, \ldots o_{N-1}$, coding $o_0, o_1, \ldots o_{N-1}$ using a tail-biting convolutional code with a length of 7 and a code rate of 1/3, or conducting Cyclic Redundancy Check (CRC) with a length of 8 before the coding, wherein N denotes a number of bits of the uplink control information which is greater than 11;

as for ACK/NACK response information and RI information, obtaining the corresponding encoded sequence $q_0, q_1, \ldots q_Q$ according to the encoded target length $Q = Q' * Q_m$ and obtaining the corresponding code modulation sequence $\underline{q}_0, \underline{q}_1, \ldots \underline{q}_{Q'}$ according to a corresponding modulation order $Q_m$ when a number of transport layers L corresponding to a transport block is 1; and obtaining the corresponding encoded sequence $q_0, q_1, \ldots q_Q$ according to the encoded target length $Q = Q' * Q_m$ when the number of transport layers L corresponding to the transport block is 2, repeating $q_0, q_1, \ldots q_Q$ and obtaining the corresponding code modulation sequence $\underline{q}_0, \underline{q}_1, \ldots \underline{q}_{Q'}$ according to the corresponding modulation order $Q_m$;

as for Channel Quality Indicator (CQI)/Pre-coding Matrix Indication (PMI) information, obtaining the corresponding encoded sequence $q_0, q_1, \ldots q_Q$ according to the encoded target length $Q = Q' * Q_m$ when the number of transport layers L corresponding to the transport block is 1, and obtaining the corresponding code modulation sequence $\underline{q}_0, \underline{q}_1, \ldots \underline{q}_{Q'}$ according to the corresponding modulation order $Q_m$ when the transport block does not have data information to be transmitted; obtaining the corresponding encoded sequence $q_0, q_1, \ldots q_Q$ according to the encoded target length $Q = L * Q' * Q_m$ when the number of transport layers L corresponding to the transport block is 2, and obtaining the corresponding code modulation sequence $\underline{q}_0, \underline{q}_1, \ldots \underline{q}_{Q'}$ according to the corresponding modulation order $Q_m$ when the transport block does not have data information to be transmitted.

8. The method according to claim 1, wherein the step of coding the data information corresponding to the one or two transport blocks respectively, obtaining the encoded sequence according to the target length, and forming the corresponding code modulation sequence from the encoded sequence according to the modulation order corresponding to the transport block and the number of transport layers corresponding to the transport block comprises:

performing CRC with a block length of 24, code block segmentation and CRC with a subblock length of 24 on the data information corresponding to the transport block required to be transmitted, performing channel coding and rate matching using Turbo codes with a code rate of ⅓, calculating the target length G of the transport block according to a corresponding bandwidth, number of symbols, the target length of CQI/PMI information on the transport block and the target length of RI information required to be transmitted on the transport block at the same time, thereby obtaining a corresponding encoded data information $f_0, f_1, f_2, f_3, \ldots, f_{G-1}$;

cascading of the encoded data information $f_0, f_1, f_2, f_3, \ldots, f_{G-1}$ and encoded CQI/PMI information $q_0, q_1, q_2, q_3, \ldots, q_{Q_{CQI}-1}$ when the transport block also requires to transmit CQI/PMI information, and forming a corresponding data/control code modulation sequence $g_0, g_1, g_2, g_3, \ldots, g_{H'-1}$ according to a modulation order of the transport block and a number of transport layers corresponding to the transport block, where $H=(G+Q_{CQI})$, and a length of the corresponding data/control code modulation sequence $H'=H/Q_m$;

forming the corresponding data code modulation sequence $g_0, g_1, g_2, g_3, \ldots, g_{H'-1}$ from the encoded data information $f_0, f_1, f_2, f_3, \ldots, f_{G-1}$ according to the modulation order and the number of transport layers corresponding to the transport block when the transport block does not need to transmit CQI/PMI information, where $H=G$ and the length of the corresponding control code modulation sequence $H'=H/Q_m$.

9. A method for determining a number of code symbols required in each layer when transmitting uplink control information on Physical Uplink Shared Channel (PUSCH) with spatial multiplexing, comprising:

determining the number of coded symbols required in each layer with the following formula: $Q'=\max(Q'', Q'_{min})$, where $Q'_{min}=\lceil \beta_{offset}^{PUSCH} * \alpha \rceil$, or $Q'_{min}=\lceil \alpha \rceil$, or $Q'_{min}=\alpha$, $\lceil \ \rceil$ represents ceil, $\beta_{offset}^{PUSCH}$ is an offset corresponding to the uplink control information and the value is configured by high-layer signaling, $\alpha$ is greater than 0;

Q' is a number of coded symbols required in each layer when transmitting the uplink control information on the PUSCH with spatial multiplexing, Q' is a revised number of Q'', $Q'_{min}$ is for ensuring a code rate of encoded uplink control information is not greater than 1;

wherein the uplink control information is one or more of: Acknowledgement/Negative Acknowledgement (ACK/NACK) information and Rank Indication (RI) information.

10. The method according to claim 9, wherein the value of $\alpha$ is one of the following values:
the value of $\alpha$ is configured by a high layer; or $$\alpha = \begin{cases} p, & \beta_{offset}^{PUSCH} \geq m \\ q, & \beta_{offset}^{PUSCH} < m, \end{cases}$$

where the values of p, q and m are positive numbers agreed by a base station and a UE; or the value of $\alpha$ is obtained based on the value of $\beta_{offset}^{PUSCH}$; or $\alpha=0$; or $\alpha=c*O/Q_m$, where the value of c is a positive number configured by the high layer or agreed by the base station and the UE, and the value of $Q_m$ is a positive number not being 0 agreed by the base station and the UE or a modulation order corresponding to a transport block.

11. The method according to claim 10, wherein,
when there is only one transport block, then the value of $Q_m$ is the modulation order corresponding to the transport block; and when there are two transport blocks, then the value of $Q_m$ is a smaller one or an average of the modulation orders corresponding to the two transport blocks.

12. The method according to claim 9, wherein the value of Q' is one of the following:

$$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right),$$

or $$Q'' = \min\left(\left\lceil \frac{O \cdot M_{sc}^{PUSCH} \cdot N_{symb}^{PUSCH} \cdot \beta_{offset}^{PUSCH}}{O_{CQI-MIN}} \right\rceil, 4 \cdot M_{sc}^{PUSCH}\right),$$

or $$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH}\right),$$

or $$Q'' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r + O_{CQI-MIN}} \right\rceil, 4 \cdot M_{sc}^{PUSCH}\right);$$

where $O_{CQI-MIN}$ denotes a number of bits of CQI/PMI information after CRC when the rank of a single downlink cell is 1; O denotes a number of bits of the uplink control information to be transmitted; $N_{symb}^{PUSCH-initial}$ denotes the number of symbols used in initial PUSCH transmission other than Demodulation Reference Signal (DMRS) and Sounding Reference Signal (SRS); $M_{sc}^{PUSCH-initial}$ denotes a bandwidth during initial PUSCH transmission and is expressed in a number of subcarriers; $M_{sc}^{PUSCH}$ denotes a bandwidth of current subframe for PUSCH transmission and is expressed in a number of subcarriers; $C^{(i)}$ denotes a number of code blocks corresponding to the transport block i after CRC and code block segmentation; $K_r^{(i)}$ denotes a number of bits corresponding to each code block of the transport block i, and the value of i is 1 or 2; $\beta_{offset}^{PUSCH}$ denotes $\beta_{offset}^{HARQ-ACK}$ or $\beta_{offset}^{RI}$, and is configured by a high layer.

13. A terminal, applied to transmit uplink control information on a Physical Uplink Shared Channel (PUSCH) with spatial multiplexing, comprising:

a code modulation module configured to code uplink control information required to be transmitted and data information corresponding to one or two transport blocks respectively, obtain an encoded sequence according to a target length, and form a corresponding code modulation sequence from the encoded sequence according to a modulation order corresponding to the transport block and a number of transport layers corresponding to the transport block; and an interleaving and transmitting module configured to interleave the obtained code modulation sequence, and transmit the interleaved code modulation sequence on a layer corresponding to the PUSCH with spatial multiplexing;

wherein the code modulation module is further configured to divide the uplink control information $o_0,o_1,\ldots o_{N-1}$ required to be transmitted into two parts $o_0^0,o_1^0,\ldots o_{ceil(N/2)-1}^0$ and $o_0^1,o_1^1,\ldots o_{ceil(N/2)-1}^1$, where N denotes a number of bits of the uplink control information which is greater than 11; determine a number of code symbols $Q'_0, Q'_1$ required to transmit the uplink control information; code $o_0^0,o_1^0,\ldots o_{ceil(N/2)-1}^0$ and $o_0^1,o_1^1,\ldots o_{ceil(N/2)-1}^1$, respectively, by using linear block code, and obtain the code modulation sequence corresponding to the uplink control information according to encoded target lengths $Q_0=Q'_0*Q_m$, $Q_1=Q'_1*Q_m$, a modulation order $Q_m$ corresponding to the transport block and a number of transport layers L corresponding to the transport block;

wherein the uplink control information is one or more of: Acknowledgement/Negative Acknowledgement (ACK/NACK) information and Rank Indication (RI) information.

14. A terminal, applied to transmit uplink control information on a Physical Uplink Shared Channel (PUSCH) with spatial multiplexing, comprising:

a code modulation module configured to code uplink control information required to be transmitted and data information corresponding to one or two transport blocks respectively, obtain an encoded sequence according to a target length, and form a corresponding code modulation sequence from the encoded sequence according to a modulation order corresponding to the transport block and a number of transport layers corresponding to the transport block; and an interleaving and transmitting module configured to interleave the obtained code modulation sequence, and transmit the interleaved code modulation sequence on a layer corresponding to the PUSCH with spatial multiplexing;

wherein the code modulation module is further configured to calculate the number of code symbols Q' required to transmit the uplink control information $o_0,o_1,\ldots o_{N-1}$, and code $o_0,o_1,\ldots o_{N-1}$ using a tail-biting convolutional code with a length of 7 and a code rate of ⅓, or conducting Cyclic Redundancy Check (CRC) with a length of 8 before the coding, wherein N denotes the number of bits of the uplink control information which is greater than 11;

as for ACK/NACK information and Rank Indication (RI) information, when a number of transport layers L corresponding to the transport block is 1, then the corresponding encoded sequence $q_0,q_1,\ldots q_Q$ is obtained according to the encoded target length $Q=Q'*Q_m$ and the corresponding code modulation sequence $\underline{q_0,q_1,\ldots q_{Q'}}$ is obtained according to the modulation order $Q_m$; when the number of transport layers L corresponding to the transport block is 2, then the corresponding encoded sequence $q_0,q_1,\ldots q_Q$ is obtained according to the encoded target length $Q=Q'*Q_m,q_0,q_1,\ldots q_Q$ is repeated, and the corresponding code modulation sequence $\underline{q_0,q_1,\ldots q_{Q'}}$ is obtained according to the corresponding modulation order $Q_m$;

as for Channel Quality Indicator (CQI)/Pre-coding Matrix Indication (PMI) information, when the number of transport layers L corresponding to the transport block is 1, then the corresponding encoded sequence $q_0,q_1,\ldots q_Q$ is obtained according to the encoded target length $Q=Q'*Q_m$; when the transport block does not have data information to be transmitted, then the corresponding code modulation sequence $\underline{q_0,q_1,\ldots q_{Q'}}$ is obtained according to the corresponding modulation order $Q_m$; when the number of transport layers L corresponding to the transport block is 2, then the corresponding encoded sequence $q_0,q_1,\ldots q_Q$ is obtained according to the encoded target length $Q=L*Q'*Q_m$; when the transport block does not have data information to be transmitted, then the corresponding code modulation sequence $\underline{q_0,q_1,\ldots q_Q}$ is obtained according to the corresponding modulation order $Q_m$.

15. The terminal according to claim 13, wherein the code modulation module is further configured to perform CRC with a block length of 24, code block segmentation and CRC with a subblock length of 24 on the data information corresponding to the transport block required to be transmitted, perform channel coding and rate matching using Turbo codes with a code rate of ⅓, calculate the target length G of the transport block according to a corresponding bandwidth, number of symbols, the target length of CQI/PMI information on the transport block and the target length of RI information required to be transmitted on the transport block at the same time, thereby obtain a corresponding encoded data information $f_0,f_1,f_2,f_3,\ldots,f_{G-1}$;

when the transport block also requires to transmit CQI/PMI information, then the encoded data information $f_0,f_1,f_2,f_3,\ldots,f_{G-1}$ and encoded CQI/PMI information $q_0,q_1,q_2,q_3,\ldots,q_{Q_{CQI}-1}$ are cascaded, and a corresponding data/control code modulation sequence $g_0,g_1,g_2,g_3,\ldots,g_{H'-1}$ is formed according to a modulation order of the transport block and a number of transport layers corresponding to the transport block, where $H=(G+Q_{CQI})$, and a length of the corresponding data/control code modulation sequence $H'=H/Q_m$;

when the transport block does not need to transmit CQI/PMI information, then the corresponding data code modulation sequence $g_0,g_1,g_2,g_3,\ldots,g_{H'-1}$ is formed from the encoded data information $f_0,f_1,f_2,f_3,\ldots,f_{G-1}$ according to the modulation order and the number of transport layers corresponding to the transport block, where H=G and the length of the corresponding control code modulation sequence H'H/$Q_m$.

16. An apparatus for determining a number of code symbols required in each layer when transmitting uplink control information on PUSCH with spatial multiplexing comprising:

a module for determining the number of coded symbols, configured to determine the number of coded symbols required in each layer with the following formula: $Q'=\max(Q',Q'_{min})$;

a parameter determination module, configured to determine $Q'=\lceil \beta_{offset}^{PUSCH}*\alpha \rceil$, or $Q'_{min}=\lceil \alpha \rceil$, or $Q'_{min}=\alpha$, where $\lceil\ \rceil$ represents ceil, and $\beta_{offset}^{PUSCH}$ is an offset corresponding to the uplink control information and the value is configured by high-layer signaling, $\alpha$ is greater than 0;

Q' is a number of coded symbols required in each layer when transmitting the uplink control information on the PUSCH with spatial multiplexing, Q' is a revised number of Q'', $Q'_{min}$ is for ensuring a code rate of encoded uplink control information is not greater than 1;
wherein the uplink control information is one or more of: Acknowledgement/Negative Acknowledgement (ACK/NACK) information and Rank Indication (RI) information.

17. A base station configured to receive the interleaved coded modulation sequence of claim 13.

18. The method according to claim 7, wherein the step of coding the data information corresponding to the one or two transport blocks respectively, obtaining the encoded sequence according to the target length, and forming the corresponding code modulation sequence from the encoded sequence according to the modulation order corresponding to the transport block and the number of transport layers corresponding to the transport block comprises:
performing CRC with a block length of 24, code block segmentation and CRC with a subblock length of 24 on the data information corresponding to the transport block required to be transmitted, performing channel coding and rate matching using Turbo codes with a code rate of ⅓, calculating the target length G of the transport block according to a corresponding bandwidth, number of symbols, the target length of CQI/PMI information on the transport block and the target length of RI information required to be transmitted on the transport block at the same time, thereby obtaining a corresponding encoded data information $f_0, f_1, f_2, f_3, \ldots, f_{G-1}$;
cascading of the encoded data information $f_0, f_1, f_2, f_3, \ldots, f_{G-1}$ and encoded CQI/PMI information $q_0, q_1, q_2, q_3, \ldots, q_{Q_{CQI}-1}$ when the transport block also requires to transmit CQI/PMI information, and forming a corresponding data/control coded modulation sequence $\underline{g}_0, \underline{g}_1, \underline{g}_2, \underline{g}_3, \ldots, \underline{g}_{H'-1}$ according to a modulation order of the transport block and a number of transport layers corresponding to the transport block, where $H=(G+Q_{CQI})$, and a length of the corresponding data/control coded modulation sequence $H'=H/Q_m$;
forming the corresponding data coded modulation sequence $\underline{g}_0, \underline{g}_1, \underline{g}_2, \underline{g}_3, \ldots, \underline{g}_{H'-1}$ from the encoded data information $f_0, f_1, f_2, f_3, \ldots, f_{G-1}$ according to the modulation order and the number of transport layers corresponding to the transport block when the transport block does not need to transmit CQI/PMI information, where $H=G$ and the length of the corresponding control coded modulation sequence $H'=H/Q_m$.

19. A base station configured to receive the interleaved coded modulation sequence of claim 14.

* * * * *